(12) United States Patent
Sun et al.

(10) Patent No.: US 10,660,032 B2
(45) Date of Patent: May 19, 2020

(54) MICRO SLEEP INDICATOR TECHNIQUES IN A WIRELESS COMMUNICATION SYSTEM

(71) Applicant: QUALCOMM Incorporated, San Diego, CA (US)

(72) Inventors: Jing Sun, San Diego, CA (US); Taesang Yoo, Riverside, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 86 days.

(21) Appl. No.: 15/425,944

(22) Filed: Feb. 6, 2017

(65) Prior Publication Data

US 2017/0303192 A1     Oct. 19, 2017

Related U.S. Application Data

(60) Provisional application No. 62/322,105, filed on Apr. 13, 2016.

(51) Int. Cl.
*H04W 52/02* (2009.01)
*H04W 72/04* (2009.01)

(52) U.S. Cl.
CPC ... *H04W 52/0206* (2013.01); *H04W 52/0216* (2013.01); *H04W 72/042* (2013.01); *Y02D 70/1222* (2018.01); *Y02D 70/1242* (2018.01); *Y02D 70/1262* (2018.01); *Y02D 70/1264* (2018.01); *Y02D 70/142* (2018.01); *Y02D 70/146* (2018.01); *Y02D 70/21* (2018.01)

(58) Field of Classification Search
CPC ......... H04W 52/0206; H04W 52/0216; H04W 72/042
See application file for complete search history.

(56) References Cited

U.S. PATENT DOCUMENTS

| | | | | |
|---|---|---|---|---|
| 2005/0223244 A1* | 10/2005 | Sinai | .......................... | G06F 1/32 713/300 |
| 2009/0016252 A1* | 1/2009 | Ho | ..................... | H04W 52/0283 370/311 |
| 2012/0230239 A1* | 9/2012 | Park | ................... | H04W 52/0235 370/311 |
| 2013/0121267 A1* | 5/2013 | Koorapaty | .......... | H04W 72/121 370/329 |

(Continued)

OTHER PUBLICATIONS

ISA/EP, International Search Report and Written Opinion of the International Searching Authority, Int'l Application No. PCT/US2017/019121, dated May 24, 2017, European Patent Office, Rijswijk, NL, 12 pgs.

*Primary Examiner* — Redentor Pasia
(74) *Attorney, Agent, or Firm* — Holland & Hart LLP

(57) ABSTRACT

A control channel transmission may include information for downlink transmissions, and another control channel, such as a physical micro sleep indicator channel (PMSICH), may include information for uplink transmissions that a user equipment (UE) may use to enter a power-saving micro sleep state. A base station may drop PMSICH transmissions in the event that downlink resources are constrained. A UE that receives a PMSICH transmission may determine an uplink transmission duration, and enter a micro sleep state for all or a portion of the uplink transmission duration.

30 Claims, 21 Drawing Sheets

(56) References Cited

U.S. PATENT DOCUMENTS

| | | | |
|---|---|---|---|
| 2013/0194995 A1* | 8/2013 | Reinhardt | H04W 52/0219 370/311 |
| 2014/0112252 A1 | 4/2014 | Hoymann et al. | |
| 2015/0208340 A1* | 7/2015 | Webb | H04W 52/0235 370/311 |
| 2015/0245340 A1* | 8/2015 | Cheng | H04W 48/12 370/331 |
| 2016/0366644 A1* | 12/2016 | Ghosh | H04W 52/0229 |
| 2018/0020475 A1* | 1/2018 | Kim | H04W 52/02 |
| 2018/0242318 A1* | 8/2018 | Christensson | H04W 52/0206 |

* cited by examiner

MICRO SLEEP INDICATOR TECHNIQUES IN A WIRELESS COMMUNICATION SYSTEM

CROSS REFERENCES

The present application for patent claims priority to U.S. Provisional Patent Application No. 62/322,105 by Sun, et al., entitled "Micro Sleep Indicator Techniques in a Wireless Communication System," filed Apr. 13, 2016, assigned to the assignee hereof.

BACKGROUND

The following relates generally to wireless communication, and more specifically to micro sleep indication for power savings at a user equipment (UE).

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may each be referred to as a UE.

Wireless multiple-access technologies have been adopted in various telecommunication standards to provide a common protocol that enables different wireless devices to communicate on a municipal, national, regional, and even global level. An example telecommunication standard is Long Term Evolution (LTE). LTE is designed to improve spectral efficiency, lower costs, improve services, make use of new spectrum, and better integrate with other open standards. LTE may use OFDMA on the downlink, single-carrier frequency division multiple access (SC-FDMA) on the uplink, and multiple-input multiple-output (MIMO) antenna technology.

Wireless communication may be supported with control signals and reference signals (such as physical downlink control channel (PDCCH) signals, physical frame format indicator channel (PFFICH) signals, cell-specific reference signals (CRS), etc.). In some cases, a base station may transmit some control signals in a layer one (L1) physical channel on multiple occasions (e.g., one transmission each transmission time interval (TTI)) in order to increase reliability. Reducing the amount of data in such L1 transmissions may enhance efficiency of a wireless communication system. Additionally, many devices, such as UEs, used in a wireless communication system may be battery operated, and thus efficient power use may be desirable in order to enhance the battery life of such devices.

SUMMARY

The described techniques relate to improved methods, systems, devices, or apparatuses that support micro sleep indication. Generally, the described techniques provide that some control information may be provided in an L1 channel, such as various transmission parameters that may be provided in an L1 PFFICH, and a micro sleep indication may be provided in a separate channel that may optionally be transmitted and that may be used by a UE to enter a power-saving micro sleep state. In some examples, PFFICH transmissions may be provided in each downlink TTI that indicate a downlink TTI length (e.g., as a number of downlink subframes having a known duration) and a number of downlink TTIs, and a separate physical micro sleep indicator channel (PMSICH) may be provided in some or all of the downlink TTIs that indicates an amount of time for which a UE may enter the micro sleep state.

A method of wireless communication is described. The method may include identifying a control region in a downlink transmission, demodulating the identified control region of the downlink transmission, identifying a micro sleep indicator received in the control region that indicates a micro sleep state may be entered for at least a portion of one or more TTIs and entering the micro sleep state for at least the portion of the one or more TTIs based at least in part on the micro sleep indicator.

An apparatus for wireless communication is described. The apparatus may include means for identifying a control region in a downlink transmission, means for demodulating the identified control region of the downlink transmission, means for identifying a micro sleep indicator received in the control region that indicates a micro sleep state may be entered for at least a portion of one or more TTIs and means for entering the micro sleep state for at least the portion of the one or more TTIs based at least in part on the micro sleep indicator.

A further apparatus is described. The apparatus may include a processor, memory in electronic communication with the processor, and instructions stored in the memory. The instructions may be operable to cause the processor to identify a control region in a downlink transmission, demodulate the identified control region of the downlink transmission, identify a micro sleep indicator received in the control region that indicates a micro sleep state may be entered for at least a portion of one or more TTIs and enter the micro sleep state for at least the portion of the one or more TTIs based at least in part on the micro sleep indicator.

A non-transitory computer readable medium for wireless communication is described. The non-transitory computer-readable medium may include instructions to cause a processor to identify a control region in a downlink transmission, demodulate the identified control region of the downlink transmission, identify a micro sleep indicator received in the control region that indicates a micro sleep state may be entered for at least a portion of one or more TTIs and enter the micro sleep state for at least the portion of the one or more TTIs based on the micro sleep indicator.

In some examples of the method, apparatus, or non-transitory computer-readable medium described above, identifying the control region comprises: identifying the control region in one or more downlink TTIs. In some examples of the method, apparatus, or non-transitory computer-readable medium described above, the control region comprises information for an uplink transmission subsequent to the downlink transmission and information for the downlink transmission.

In some examples of the method, apparatus, or non-transitory computer-readable medium described above, identifying the micro sleep indicator received in the control region comprises: identifying a TTI length indicator in the control region. Some examples of the method, apparatus, or non-transitory computer-readable medium described above may further include processes, features, means, or instructions for identifying a number of uplink TTIs of the uplink transmission based on information in the control region. Some examples of the method, apparatus, or non-transitory computer-readable medium described above may further include processes, features, means, or instructions for determining a micro sleep duration based on the TTI length indicator and the number of uplink TTIs.

In some examples of the method, apparatus, or non-transitory computer-readable medium described above, identifying the micro sleep indicator comprises: identifying a control channel element (CCE) location for the control region within one or more downlink TTIs, and where the micro sleep indicator may be received in any of the one or more downlink TTIs. In some examples of the method, apparatus, or non-transitory computer-readable medium described above, a search space for the CCE is determined based on a search space for a PDCCH.

Some examples of the method, apparatus, or non-transitory computer-readable medium described above may further include processes, features, means, or instructions for determining that the micro sleep indicator is not received in any of the one or more downlink TTIs. Some examples of the method, apparatus, or non-transitory computer-readable medium described above may further include processes, features, means, or instructions for monitoring for one or more subsequent downlink transmissions.

In some examples of the method, apparatus, or non-transitory computer-readable medium described above, entering the micro sleep state comprises: identifying a duration of one or more uplink TTIs. Some examples of the method, apparatus, or non-transitory computer-readable medium described above may further include processes, features, means, or instructions for monitoring at least a portion of one or more downlink TTIs. Some examples of the method, apparatus, or non-transitory computer-readable medium described above may further include processes, features, means, or instructions for entering the micro sleep state for at least a portion of the one or more uplink TTIs.

In some examples of the method, apparatus, or non-transitory computer-readable medium described above, entering the micro sleep state further comprises: determining that the one or more downlink TTIs do not contain a downlink grant or an uplink grant. Some examples of the method, apparatus, or non-transitory computer-readable medium described above may further include processes, features, means, or instructions for entering the micro sleep state after a last downlink TTI for a duration of one or more uplink TTIs indicated in the micro sleep indicator.

In some examples of the method, apparatus, or non-transitory computer-readable medium described above, entering the micro sleep state further comprises: determining that the one or more downlink TTIs contain a downlink grant. Some examples of the method, apparatus, or non-transitory computer-readable medium described above may further include processes, features, means, or instructions for acknowledging the downlink grant in an uplink transmission during one of the one or more uplink TTIs. Some examples of the method, apparatus, or non-transitory computer-readable medium described above may further include processes, features, means, or instructions for entering the micro sleep state after the uplink transmission for a remaining duration of one or more uplink TTIs indicated in the micro sleep indicator.

In some examples of the method, apparatus, or non-transitory computer-readable medium described above, entering the micro sleep state further comprises: determining that the one or more downlink TTIs contain an uplink grant. Some examples of the method, apparatus, or non-transitory computer-readable medium described above may further include processes, features, means, or instructions for transmitting an uplink transmission using resources provided in the uplink grant during one or more uplink TTIs.

In some examples of the method, apparatus, or non-transitory computer-readable medium described above, entering the micro sleep state further comprises: entering the micro sleep state after the uplink transmission for a remaining duration of one or more uplink TTIs indicated in the micro sleep indicator. In some examples of the method, apparatus, or non-transitory computer-readable medium described above, identifying the micro sleep indicator further comprises: identifying that the micro sleep indicator signals an absence of additional downlink grants before a subsequent uplink TTI.

In some examples of the method, apparatus, or non-transitory computer-readable medium described above, entering the micro sleep state comprises: identifying a duration of one or more uplink TTIs and one or more remaining downlink TTIs of the downlink transmission. Some examples of the method, apparatus, or non-transitory computer-readable medium described above may further include processes, features, means, or instructions for entering the micro sleep state for a remaining duration of the one or more remaining downlink TTIs and the one or more uplink TTIs.

Some examples of the method, apparatus, or non-transitory computer-readable medium described above may further include processes, features, means, or instructions for determining a duration of the downlink transmission and a subsequent uplink transmission period. In some examples of the method, apparatus, or non-transitory computer-readable medium described above, the micro sleep indicator comprises an indicator that the micro sleep state may be entered for at least a portion of the downlink and subsequent uplink transmission period.

In some examples of the method, apparatus, or non-transitory computer-readable medium described above, determining the duration of the downlink transmission and the subsequent uplink transmission period comprises: identifying the duration of the downlink transmission and the subsequent uplink transmission period from a PFFICH transmission, or identifying the duration of the downlink transmission and the subsequent uplink transmission period from a request-to-send/clear-to-send (RTS/CTS) procedure initiated prior to the downlink transmission.

In some examples of the method, apparatus, or non-transitory computer-readable medium described above, the micro sleep indicator comprises a one-bit indicator that indicates the micro sleep state may be entered in an absence of a downlink or uplink grant. In some examples of the method, apparatus, or non-transitory computer-readable medium described above, the micro sleep indicator is transmitted in a PMSICH or a physical control format indicator channel (PCFICH). In some examples of the method, apparatus, or non-transitory computer-readable medium described above, the micro sleep indicator is transmitted in a PDCCH transmission.

In some examples of the method, apparatus, or non-transitory computer-readable medium described above, the micro sleep indicator provides an indication of a duration of a portion of a current downlink TTI. In some examples of the method, apparatus, or non-transitory computer-readable medium described above, entering the micro sleep state comprises: entering the micro sleep state for the duration of the portion of the current downlink TTI. Some examples of the method, apparatus, or non-transitory computer-readable medium described above may further include processes, features, means, or instructions for exiting the micro sleep state at a start of a subsequent downlink TTI after the current downlink TTI.

In some examples of the method, apparatus, or non-transitory computer-readable medium described above, the micro sleep indicator is received in a PCFICH transmission that indicates an absence of a PDCCH transmission for a receiver during the current downlink TTI. In some examples of the method, apparatus, or non-transitory computer-readable medium described above, the micro sleep state is entered prior to receiving any PDCCH transmissions received in the current downlink TTI.

A method of wireless communication is described. The method may include identifying a downlink transmission duration for downlink transmissions to one or more UEs and an uplink transmission duration for uplink transmissions from the one or more UE, determining a micro sleep indicator that indicates the one or more UEs may enter a micro sleep state for at least a portion of the downlink transmission duration, the uplink transmission duration, or any combination thereof and transmitting the micro sleep indicator to the one or more UEs in a control channel.

An apparatus for wireless communication is described. The apparatus may include means for identifying a downlink transmission duration for downlink transmissions to one or more UEs and an uplink transmission duration for uplink transmissions from the one or more UE, means for determining a micro sleep indicator that indicates the one or more UEs may enter a micro sleep state for at least a portion of the downlink transmission duration, the uplink transmission duration, or any combination thereof and means for transmitting the micro sleep indicator to the one or more UEs in a control channel.

A further apparatus is described. The apparatus may include a processor, memory in electronic communication with the processor, and instructions stored in the memory. The instructions may be operable to cause the processor to identify a downlink transmission duration for downlink transmissions to one or more UEs and an uplink transmission duration for uplink transmissions from the one or more UE, determine a micro sleep indicator that indicates the one or more UEs may enter a micro sleep state for at least a portion of the downlink transmission duration, the uplink transmission duration, or any combination thereof and transmit the micro sleep indicator to the one or more UEs in a control channel.

A non-transitory computer readable medium for wireless communication is described. The non-transitory computer-readable medium may include instructions to cause a processor to identify a downlink transmission duration for downlink transmissions to one or more UEs and an uplink transmission duration for uplink transmissions from the one or more UE, determine a micro sleep indicator that indicates the one or more UEs may enter a micro sleep state for at least a portion of the downlink transmission duration, the uplink transmission duration, or any combination thereof and transmit the micro sleep indicator to the one or more UEs in a control channel.

Some examples of the method, apparatus, or non-transitory computer-readable medium described above may further include processes, features, means, or instructions for identifying a downlink TTI duration for the downlink transmissions. Some examples of the method, apparatus, or non-transitory computer-readable medium described above may further include processes, features, means, or instructions for identifying a number of downlink TTIs that are to be used for the downlink transmissions, where the downlink transmission duration corresponds to the downlink TTI duration and number of downlink TTIs. Some examples of the method, apparatus, or non-transitory computer-readable medium described above may further include processes, features, means, or instructions for transmitting an indication of the downlink TTI duration and number of downlink TTIs to the one or more UEs in the control channel.

In some examples of the method, apparatus, or non-transitory computer-readable medium described above, determining the micro sleep indicator comprises: setting an uplink TTI duration that corresponds to the downlink TTI duration. Some examples of the method, apparatus, or non-transitory computer-readable medium described above may further include processes, features, means, or instructions for identifying a number of uplink TTIs that are to be used for the uplink transmissions, where an uplink transmission duration corresponds to the uplink TTI duration and number of uplink TTIs. Some examples of the method, apparatus, or non-transitory computer-readable medium described above may further include processes, features, means, or instructions for setting the micro sleep indicator based on the number of uplink TTIs.

In some examples of the method, apparatus, or non-transitory computer-readable medium described above, transmitting the micro sleep indicator comprises: identifying a CCE for transmission of the control channel within one or more downlink TTIs. Some examples of the method, apparatus, or non-transitory computer-readable medium described above may further include processes, features, means, or instructions for determining that a first downlink TTI of the one or more downlink TTIs has available resources to transmit the control channel. Some examples of the method, apparatus, or non-transitory computer-readable medium described above may further include processes, features, means, or instructions for configuring the control channel in the identified CCE of the first downlink TTI. Some examples of the method, apparatus, or non-transitory computer-readable medium described above may further include processes, features, means, or instructions for transmitting the control channel.

In some examples of the method, apparatus, or non-transitory computer-readable medium described above, transmitting the micro sleep indicator comprises: identifying a CCE for the control channel within one or more downlink TTIs. Some examples of the method, apparatus, or non-transitory computer-readable medium described above may further include processes, features, means, or instructions for determining that a first downlink TTI of one or more downlink TTIs lacks available resources to transmit the control channel. Some examples of the method, apparatus, or non-transitory computer-readable medium described above may further include processes, features, means, or instructions for skipping the transmission of the control channel in the first downlink TTI.

In some examples of the method, apparatus, or non-transitory computer-readable medium described above, the micro sleep indicator comprises an indicator that the micro sleep state may be entered in an absence of a downlink or uplink grant to a UE. In some examples of the method, apparatus, or non-transitory computer-readable medium described above, the control channel comprises a PMSICH that is transmitted separately from a PFFICH.

In some examples of the method, apparatus, or non-transitory computer-readable medium described above, determining the micro sleep indicator comprises: determining, during a first downlink TTI, that no new UEs are to scheduled for downlink transmissions during remaining downlink TTIs of the downlink transmission duration, and setting the micro sleep indicator to indicate that the one or more UEs may enter the micro sleep state for at least a portion of the remaining downlink TTIs.

In some examples of the method, apparatus, or non-transitory computer-readable medium described above, determining that no new UEs are to be scheduled for downlink transmissions during remaining downlink TTIs of the downlink transmission duration further comprises: determining that no broadcast grants are scheduled for downlink transmission during remaining downlink TTIs of the downlink transmission duration. In some examples of the method, apparatus, or non-transitory computer-readable medium described above, the control channel comprises a PDCCH.

In some examples of the method, apparatus, or non-transitory computer-readable medium described above, the micro sleep indicator provides an indication of a duration of a portion of a current downlink TTI and that the one or more UEs may enter the micro sleep state for the duration of the portion of the current downlink TTI and exit the micro sleep state at a start of a subsequent downlink TTI after the current downlink TTI. In some examples of the method, apparatus, or non-transitory computer-readable medium described above, the micro sleep indicator indicates an absence of a PDCCH transmission for a UE during the current downlink TTI.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
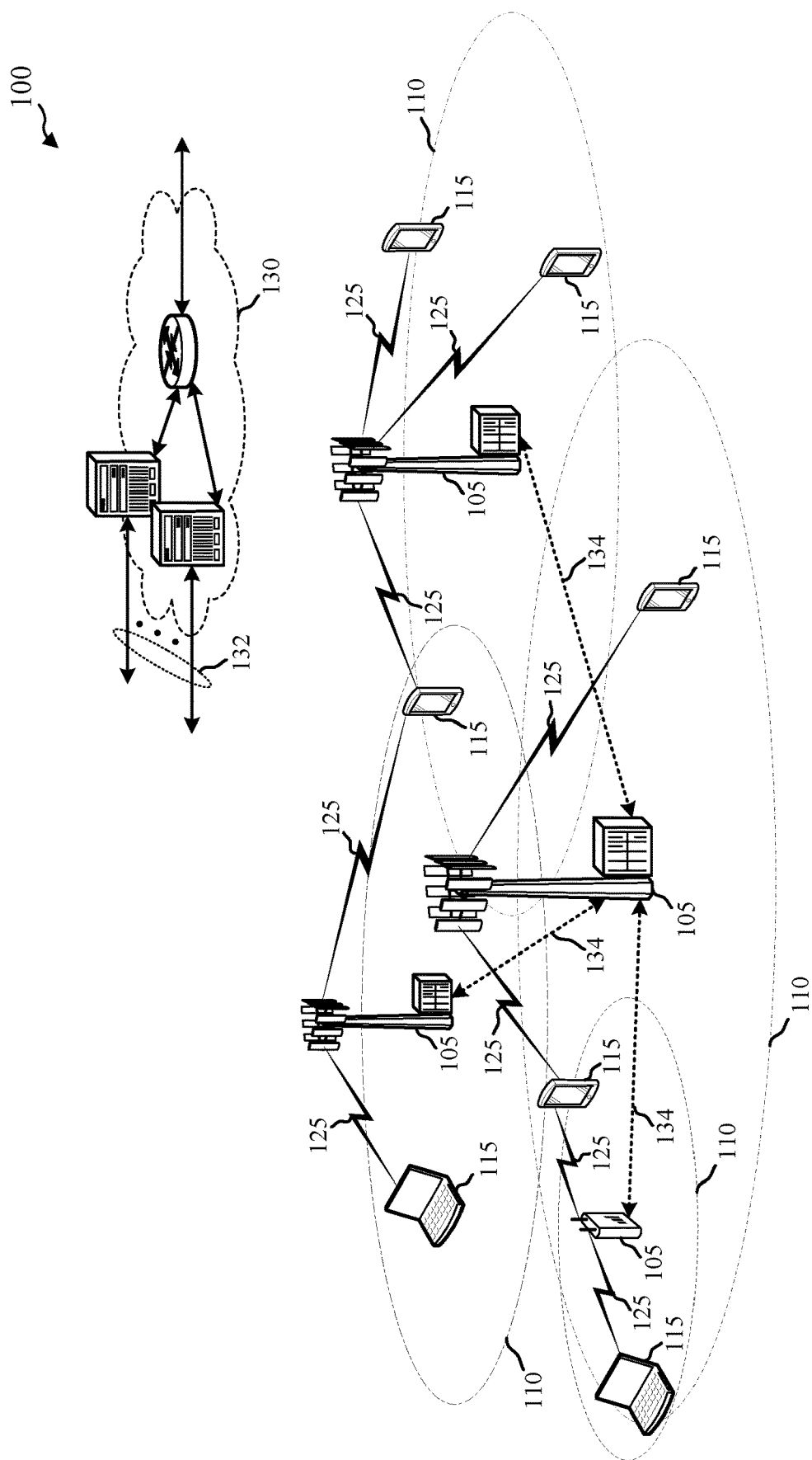
FIG. 1 illustrates an example of a wireless communication system that supports micro sleep indication in accordance with aspects of the present disclosure.

The present disclosure provides techniques for enhanced power savings at a UE as well as for efficient L1 control channel usage in wireless communication systems. As indicated above, in some scenarios an L1 PFFICH may be used to signal various parameters associated with uplink and downlink transmissions. In some deployments, a PFFICH transmission may include information for both downlink transmission duration(s) and uplink transmission duration(s). For example, a PFFICH may include information on a downlink TTI duration, a number of downlink TTIs, and information on an uplink transmission duration. Various examples of the present disclosure provide that a PFFICH transmission may include information for downlink transmissions, and another control channel, such as a PMSICH, may include information for uplink transmissions that a UE may use to enter a power-saving micro sleep state. The L1 PFFICH transmission may thus use fewer L1 resources, and a UE may achieve enhanced power savings. In some examples, a base station may drop PMSICH transmissions in the event that downlink resources are constrained. A UE that receives a PMSICH transmission may determine an uplink transmission duration, and enter a micro sleep state for all or a portion of the uplink transmission duration.

As indicated above, in some examples a base station may transmit a PFFICH transmission in every downlink TTI. Thus, reducing the amount of information in the PFFICH transmissions may reduce a number of resource elements (REs) needed for the PFFICH transmissions and thereby enhance network efficiency. A UE may, in some examples, monitor PFFICH transmissions and identify a duration for downlink transmissions. Such a UE may also monitor for PMSICH transmissions and identify a duration for uplink transmissions. In the event that such a UE does not have any uplink transmissions scheduled, the UE may enter a micro sleep state for the duration of the uplink transmissions, thus reducing UE power consumption. In the event that the UE does have an uplink transmission, the UE may enter the micro sleep state for any remaining time of the duration of the uplink transmissions following completion of its uplink transmission. Additionally, in some examples, the PMSICH may have a lower priority than one or more other downlink channels, and a base station may drop the PMSICH transmission for a TTI in the event that higher priority transmissions occupy the available downlink resources. In such cases, if a UE does not receive the PMSICH, the UE may not enter the micro sleep state for the period of the uplink transmissions, and simply use some additional power without impacting reliability of communications.

In some examples, a base station may transmit the PMSICH in multiple consecutive downlink TTIs, and a UE that receives any of the PMSICH transmissions may use the information to potentially enter a micro sleep state. In further examples, if a UE does not have additional downlink transmissions within a downlink transmission burst, the UE may enter the micro sleep state immediately following the receipt of the PMSICH, thus resulting in a sleep duration that covers remaining downlink TTIs as well as the uplink transmission duration.

In some examples, a UE may enter micro sleep in a TTI level, in which a UE may sleep during a downlink TTI and wake up for a subsequent downlink TTI. In some examples, a special value in a PCFICH that indicates that the control region size is minimum (1 symbol) and indicates that there is no PDCCH in the current TTI. In such examples, the UE does not need to perform PDCCH decoding and if the UE does not have a downlink grant (e.g., in the form of multi-TTI downlink grant received in a previous TTI) the UE may go to micro sleep and may wake up before the next TTI to check the PDCCH again. Thus, additional power savings may be achieved.

Aspects of the disclosure are initially described in the context of a wireless communication system. Micro sleep indication schemes that provide micro sleep indications are discussed, in addition to examples of different resources that may carry a micro sleep indication. Aspects of the disclosure are further illustrated by and described with reference to apparatus diagrams, system diagrams, and flowcharts that relate to reference signal transmission in wireless communications with multiple receivers.

FIG. 1 illustrates an example of a wireless communication system 100 in accordance with various aspects of the present disclosure. The wireless communication system 100 includes base stations 105, UEs 115, and a core network 130. In some examples, the wireless communication system 100 may be a LTE/LTE-Advanced (LTE-A) network. Wireless communications system 100 may support transmitting micro sleep indicators for enhanced power savings at UEs 115.

Base stations 105 may wirelessly communicate with UEs 115 via one or more base station antennas. Each base station 105 may provide communication coverage for a respective geographic coverage area 110. Communication links 125 shown in wireless communication system 100 may include uplink transmissions from a UE 115 to a base station 105, or downlink transmissions, from a base station 105 to a UE 115. UEs 115 may be dispersed throughout the wireless communication system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, an machine type communication (MTC) device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

In some cases, wireless communication system 100 may utilize enhanced component carriers (eCC). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other component carriers (CCs), which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 Mhz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, a UE 115 or base station 105 may operate in a shared or unlicensed frequency spectrum. These devices may access the radio frequency spectrum using a contention-based access technique, such as a listen before talk (LBT) scheme. For example, a UE 115 or base station 105 may perform a clear channel assessment (CCA) prior to communicating in order to determine whether the channel is available. A CCA may include an energy detection procedure to determine whether there are any other active transmissions. For example, the device may infer that a change in a received signal strength indication (RSSI) of a power meter indicates that a channel is occupied. Specifically, signal power that is concentrated in a certain bandwidth and exceeds a predetermined noise floor may indicate another wireless transmitter. A CCA may also include detection of specific sequences that indicate use of the channel. For example, another device may transmit a specific preamble prior to transmitting a data sequence. In some examples, a base station 105 operating using shared or unlicensed frequency spectrum may provide a frame structure to one or more associated UEs 115 in a PFFICH transmission that indicates a number of downlink subframes and a number of uplink subframes associated with a transmission opportunity.

Similarly, some eCC deployments may define L1 resources for various physical channels, such as a PFFICH, PCFICH, PDCCH, etc. In some eCC deployments, PFFICH transmissions may contain an indication of downlink TTI length (e.g., in units of subframes in which a duration of each downlink subframe is known), an indication of the number of downlink TTIs, and an uplink length (e.g., in units of subframes in which a duration of each uplink subframe is known). However, PFFICH transmissions with this information may require a number of REs to transmit, and thus consume a relatively large number of L1 channel REs. Additionally, in some examples, to increase the reliability, the PFFICH may be retransmitted in each downlink TTI with a count-down design (e.g., the number of downlink TTIs may be decremented in consecutive PFFICH transmissions). The uplink information of such PFFICH transmissions, however, may be used by UEs 115 to identify uplink transmission information for purposes of powering down some components, such as transmit/receive chains, in order to save power. Such powering down of some components may be referred to herein as going to sleep or entering a micro sleep state. If a UE 115 has an uplink grant, the uplink transmission length may be determined based on the uplink grant, thus rendering the information in the PFFICH redundant for such UEs 115. The uplink length information may be useful for UEs 115 without an uplink grant to go into micro sleep knowing that no downlink transmissions will be transmitted.

In order to reduce the amount of L1 resources (e.g., number of REs) for such PFFICH transmissions, various examples of the present disclosure provide a PFFICH that does not include uplink duration information and instead provides uplink information in one or more other channels that may consume fewer REs, may be transmitted less often than PFFICH transmissions, may be dropped if a higher priority channel is to be transmitted, or any combination thereof. In some examples, a base station 105 may transmit another control channel, such as a PMSICH, that may include information for uplink transmissions that a UE 115 may use to enter a power-saving micro sleep state. The L1 PFFICH transmission may thus use fewer L1 resources, and a UE 115 may achieve enhanced power savings. In some examples, a base station 105 may drop PMSICH transmissions in the event that higher priority downlink channels are to be transmitted. A UE 115 that receives a PMSICH transmission may determine an uplink transmission duration, and enter a micro sleep state for all or a portion of the uplink transmission duration, and in some examples may enter the micro sleep state for a portion of the downlink transmissions.

Figure 2:
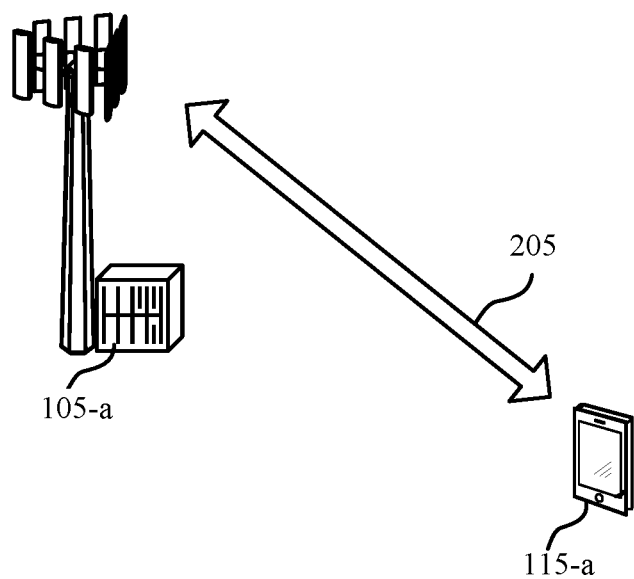
FIG. 2 illustrates an example of a wireless communication system that supports micro sleep indication in accordance with aspects of the present disclosure.

FIG. 2 illustrates an example of a wireless communication system 200 for micro sleep indication. Wireless communication system 200 may include base station 105-a and UE 115-a, which may be examples of the corresponding devices described with reference to FIG. 1. Base station 105-a may transmit downlink transmissions to, and receive uplink transmissions from, UE 115-a (and one or more other UEs if present) via communication link 205. As indicated above, in some examples downlink transmissions may include one or more downlink TTIs that may include control information indicating one or more downlink transmission parameters, and that may include uplink transmission information that UE 115-a may use to enter a micro sleep state.

In some examples, the control information indicating downlink transmission parameters may be provided in a PFFICH transmission, and another control channel, such as a PMSICH, may include information for uplink transmissions that the UE 115-a may use to enter the power-saving micro sleep state. In some examples, base station 105-a may drop PMSICH transmissions in the event that downlink resources are constrained. The UE 115-a may receive the PMSICH transmission, may determine an uplink transmission duration, and enter the micro sleep state for all or a portion of the uplink transmission duration.

As indicated above, in some examples the base station 105-a may transmit a PFFICH transmission in every downlink TTI. The UE 115-a may, in some examples, monitor PFFICH transmissions and identify a duration for downlink transmissions, and may also monitor for PMSICH transmissions and identify a duration for uplink transmissions. If UE 115-a does not have any uplink transmissions scheduled, the UE 115-a may enter the micro sleep state for the duration of the uplink transmissions, thus reducing power consumption. In the event that UE 115-a does have an uplink transmission, UE 115-a may enter the micro sleep state for any remaining time of the duration of the uplink transmissions following completion of its uplink transmission. Additionally, in some examples, the PMSICH may have a lower priority than one or more other downlink channels, and base station 105-a may drop the PMSICH transmission for a TTI in the event that higher priority transmissions occupy the available downlink resources. In such cases, if UE 115-a does not receive the PMSICH, the UE 115-a may not enter the micro sleep state for the period of the uplink transmissions, and simply use some additional power without impacting reliability of communications.

In some examples, base station 105-a may transmit the PMSICH in multiple consecutive downlink TTIs, and the UE 115-a may receive PMSICH transmission in one or more of the downlink TTIs, and may use the information to potentially enter the micro sleep state. In some examples, if the UE 115-a does not have additional downlink transmissions within a downlink transmission burst, the UE 115-a may enter the micro sleep state immediately following the receipt of the PMSICH, thus resulting in a sleep duration that covers remaining downlink TTIs as well as the uplink transmission duration.

In some examples, the UE 115-a may enter the micro sleep at a TTI level, in which UE 115-a may sleep during a downlink TTI and wake up for a subsequent downlink TTI. In some examples, a special value in a PCFICH that indicates that the control region size is minimum (1 symbol) and indicates that there is no PDCCH in the current TTI. In such examples, the UE 115-a does not need to perform PDCCH decoding and if the UE 115-a does not have a downlink grant (e.g., in the form of multi-TTI downlink grant received in a previous TTI) the UE 115-a may go to micro sleep and may wake up before the next TTI to check the PDCCH again. Thus, additional power savings may be achieved.

Figure 3:
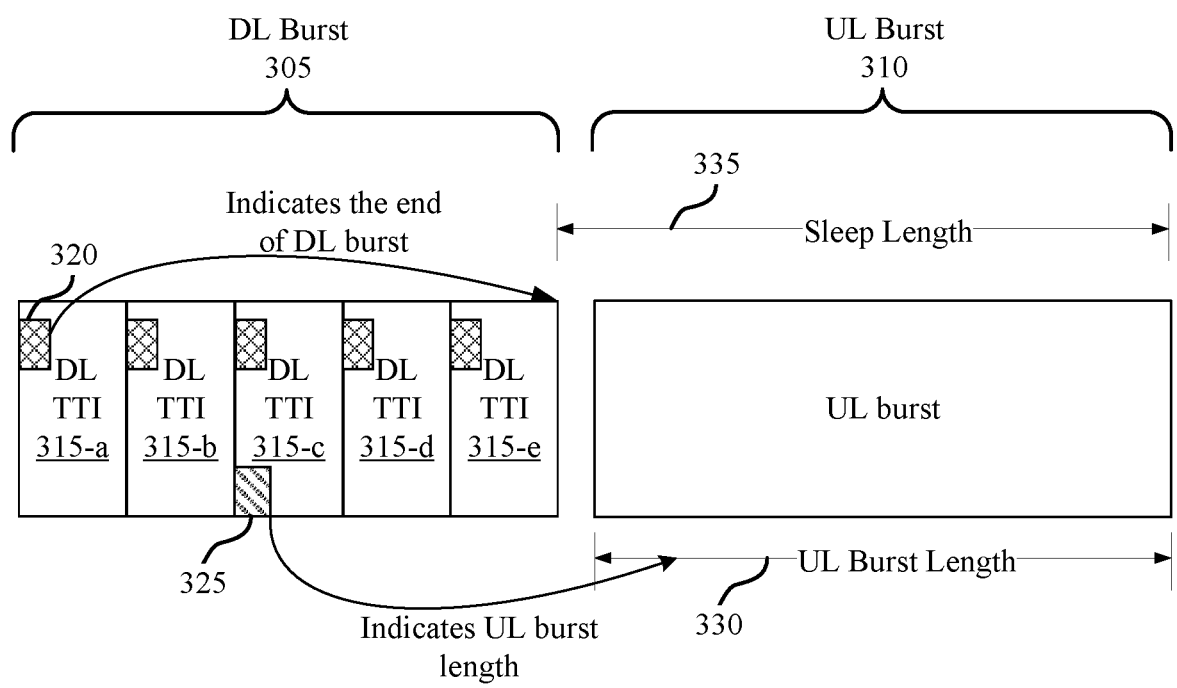
FIGS. 3 through 6 illustrate examples of downlink and uplink resources that support micro sleep indication in accordance with aspects of the present disclosure.

FIG. 3 illustrates an example of downlink and uplink resources 300 that support micro sleep indication. In some cases, downlink and uplink resources 300 may be transmitted using aspects of techniques performed by a UE 115 or base station 105 as described with reference to FIGS. 1-2. Downlink and uplink resources 300 may include a downlink burst 305 and an uplink burst 310. Downlink burst 305 may include a number of downlink TTIs 315. Similarly, uplink burst 310 may include a number of uplink TTIs (not shown). Each downlink TTI 315 in this example includes PFFICH resources 320. In some examples, PFFICH resources 320 may include downlink information in a PFFICH payload, such as an indication of downlink TTI length and a number of downlink TTI. Such a PFFICH payload may thereby result in a reduced PFFICH payload size relative to a PFFICH payload that also includes uplink information, thus reducing L1 resources consumed by PFFICH resources 320.

In order to provide uplink transmission parameters, another L1 channel may be provided in a control region of one or more downlink TTIs 315 that may be used for micro sleep indications. In some examples, the other L1 channel may be a PMSICH that is transmitted using PMSICH resources 325. In some examples, the PMSICH may be transmitted in a CCE that is parallel to PFFICH resources 320. In some examples, the PMSICH will indicate an uplink TTI length through reuse of a same TTI length field from the PFFICH in the same TTI. In the example of FIG. 3, a third downlink TTI 315-c may include the PMSICH resources 325, but in some examples the PMSICH may be transmitted in any TTI 315 in the downlink burst 305. In some examples, in order to provide efficiency in search space design, the PMSICH resources 320 may share an aggregation level one (AU) PDCCH search space with a PDCCH. For example, a UE may try to decode an AL1 PDCCH in a first AL1 CCE and also try to decode the PMSICH in the same CCE. In some examples, the PMSICH may have a four bit or a six bit payload, which may be used to convey a number of uplink TTIs contained in uplink burst 310, which may be used to determine the uplink burst length 330.

As indicated above, PMSICH resources 325 may be included in one or more downlink TTI 315, and a base station may allocate PMSICH resources and decide to make a PMSICH transmission. For example, if data having a higher priority is present, transmission of PMSICH for a TTI may be dropped in favor of the higher priority traffic. In the event that PMSICH is not transmitted, receiving UEs may simply continue monitoring for transmissions. In the event that none of the downlink TTIs 315 contain a PMSICH transmission (e.g., if each downlink TTI 315 has higher priority traffic that consumes all of the resources of the TTI 315), power usage may be increased for UEs in the particular uplink burst 310, but not impact reliability of communications. Similarly, if downlink resources are available, the PMSICH may be transmitted in each downlink TTI 315, thus providing multiple opportunities for UEs to receive PMSICH and thereby enhancing the likelihood of successful reception at the UEs. The decoding of the PMSICH also may not be time critical, as one or more downlink TTIs 315 may be present between the PMSICH resources 325 and the start of the uplink burst 310.

The content of the PMSICH resources 325 may imply the uplink burst length 330, that may be used by a UE to determine a sleep duration 335 so the UE can go into a micro sleep state. In the event that a UE detects a PMSICH transmission on the PMSICH resources 325, the UE may continue to monitor any remaining downlink TTIs 315. An indication of the end of the downlink burst may be included in PFFICH resources, and when the UE identifies the last downlink TTI 315-e, and there are no downlink or uplink grants to the UE within downlink and uplink resources 300, the UE may can go into micro sleep for the length of the sleep duration 335. If the UE has a downlink grant within downlink burst 305, the UE may attempt to receive and decode the downlink grant, and may transmit physical uplink control channel (PUCCH) information to the base station to provide feedback on the downlink grant (e.g., HARQ ACK/NAK feedback, etc.). After the PUCCH transmission within the uplink burst 330, the UE may then go into micro sleep until the time indicated by PMSICH expires. If the UE receives an uplink grant, then the UE may transmit uplink transmissions, such as physical uplink shared channel (PUSCH) transmissions, in the uplink burst 310. In some examples, the PUSCH grant may be shorter than the full uplink burst length 330, and the UE may still go to micro sleep when the PUSCH transmission is done, and wake up again when the time indicated by the PMSICH is reached.

Figure 4:
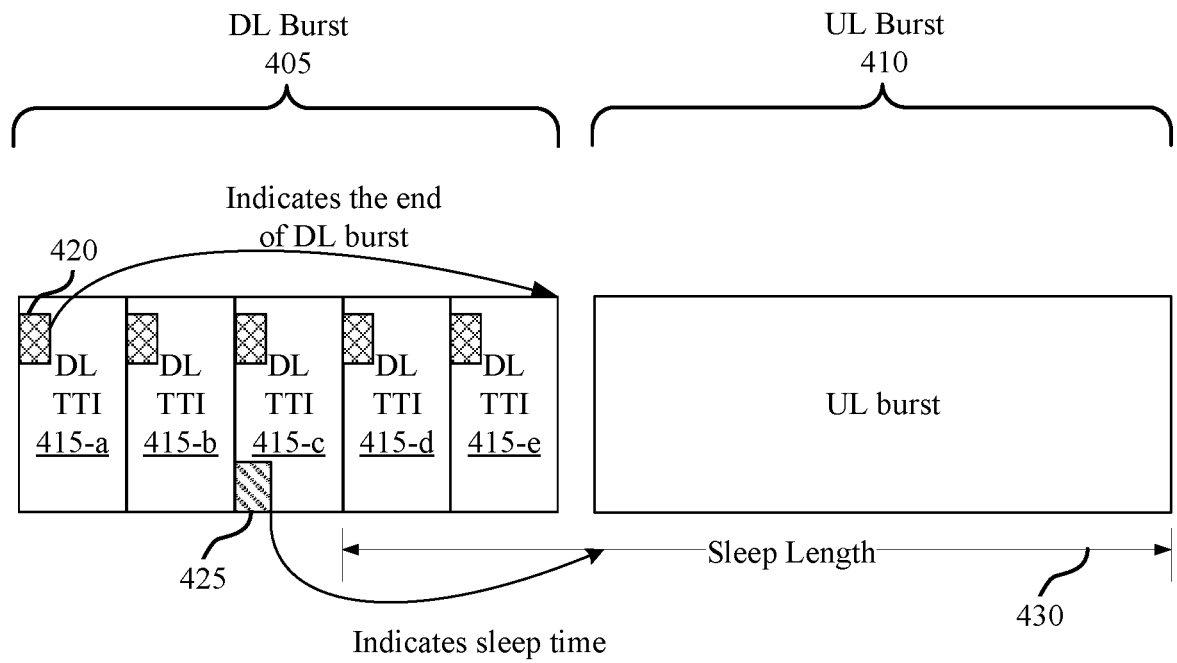
Figure 4:
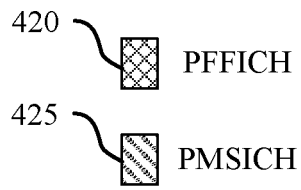

FIG. 4 illustrates an example of downlink and uplink resources 400 that support micro sleep indication. In some cases, downlink and uplink resources 400 may be transmitted using aspects of techniques performed by a UE 115 or base station 105 as described with reference to FIGS. 1-2. Downlink and uplink resources 400 may include a downlink burst 405 and an uplink burst 410, similarly as discussed above. Downlink burst 405 may include a number of downlink TTIs 415. Similarly, uplink burst 410 may include a number of uplink TTIs (not shown). Each downlink TTI 415 in this example includes PFFICH resources 420. In some examples, PFFICH resources 420 may include downlink information in a PFFICH payload, such as an indication of downlink TTI length and a number of downlink TTI, as discussed above. Uplink parameters, such as an indication of uplink burst length, may be provided in PMSICH resources 425.

In the example of FIG. 4, the PMSICH resources 425 may imply that, starting from a current TTI, such as TTI 415-c, the UE may have a sleep length 430. Such a sleep length 430 may covers the remaining downlink length of downlink TTIs 415-d and 415-e, and the full uplink burst length. Such an indication may be transmitted when there are no new UEs to be scheduled and there are no grants in downlink TTIs following the PMSICH resources 425 for UEs without another grant earlier (e.g., from a multi-TTI grant). In cases, where a UE already has an uplink or downlink grant, such a UE may still be served with a downlink or uplink subsequent to PMSICH resources 425, as the UE will stay awake and there is no power saving loss. In some examples, there may not be any subsequent broadcast grants as well (e.g., group power control PDCCH or downlink grant for broadcast physical downlink shared channel (PDSCH)). In such a manner, the UEs not yet being scheduled in downlink or uplink can go to micro sleep, and may have a longer sleep duration relative to the sleep duration in the examples of FIG. 3.

Figure 5:
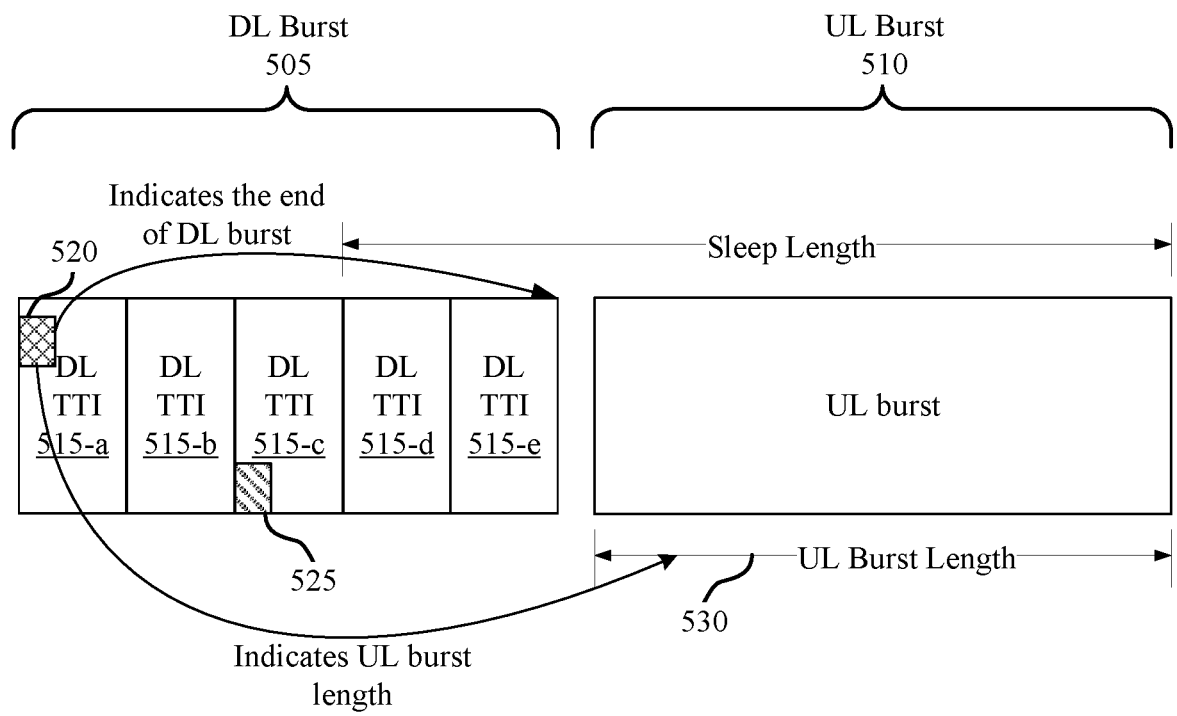

FIG. 5 illustrates an example of downlink and uplink resources 500 that support micro sleep indication. In some cases, downlink and uplink resources 500 may be transmitted using aspects of techniques performed by a UE 115 or base station 105 as described with reference to FIGS. 1-2. Downlink and uplink resources 500 may include a downlink burst 505 and an uplink burst 510, similarly as discussed above. Downlink burst 505 may include a number of downlink TTIs 515. Similarly, uplink burst 510 may include a number of uplink TTIs (not shown). Each downlink TTI 515 in this example includes PFFICH resources 520.

In some examples, PFFICH resources 520 may include downlink information in a PFFICH payload, such as an indication of downlink TTI length and a number of downlink TTI, as discussed above. Uplink parameters, such as an indication of uplink burst length 530, may be determined in from other information available to a UE, such as a number of downlink and uplink TTIs, etc. In such cases, PMSICH resources 525 may include a one-bit PMSICH indicator, as there is no need to carry the length of the micro sleep information with the PMSICH. For example, if there is a RTS/CTS) transaction with a proper network allocation vector (NAV) field design, a UE may determine downlink and uplink length information. In other examples, the PFFICH resources 520 may contain both uplink and downlink length information. In such cases, a one bit PMSICH resource 525 may be provided to indicate to UEs not being served to go to sleep until the end of the LBT frame following the indication. This one-bit information, in some examples, may be a one bit L1 channel (PMSICH) or a special value for PCFICH In some examples, instead of using an L1 channel for PMSICH, a base station may use PDCCH resources to convey the same information. Such PDCCH transmission may be decided (e.g., based on priority as discussed above), and the transmission may be dropped in the event that higher priority transmissions are present in a TTI, and the base station may transmit the PDCCH resources in the event that there are spare PDCCH resources. In some examples, the aggregation level for such PDCCH transmissions may be selected to reliably reach one or more UEs having relatively poor channel conditions.

Figure 6:
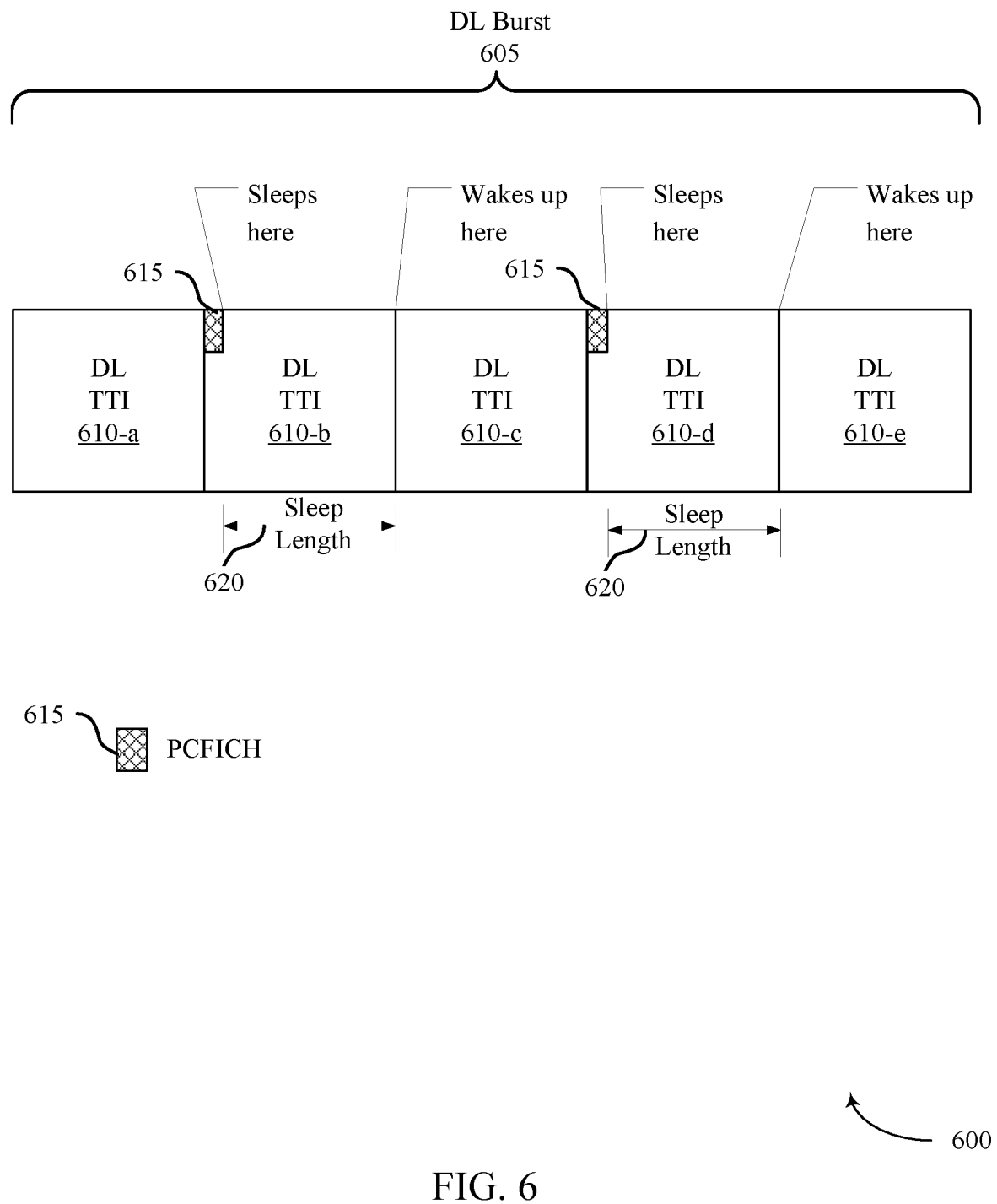

FIG. 6 illustrates an example of downlink resources 600 that support micro sleep indication. In some cases, downlink resources 600 may be transmitted using aspects of techniques performed by a UE 115 or base station 105 as described with reference to FIGS. 1-2. Downlink resources 600 may include a downlink burst 605 that may include multiple downlink TTIs 610. In this example, a UE may enter a TTI-level micro sleep, in which the UE sleeps in a TTI 610 and wakes up to receive a subsequent TTI. In this example, PCFICH resources 615 may be provided with a special value that indicates that the control region size is minimum (1 symbol) and indicates that there is no PDCCH in the current TTI. The UE does not need to perform PDCCH decoding in such cases, and any UE without a downlink grant (in the form of multi-TTI downlink grant previously received) can go to micro sleep for sleep length 620. The UEs will wake up before the next TTI to check on the PDCCH again. Such a design may be useful if a base station has no PDCCH on the current TTI but intends to send downlink/uplink grants in later TTIs. Without this design, a UE may go to micro sleep after detecting the PDCCH and sees no grant for itself, and the saving is PDCCH decoding as a result.

Figure 7:
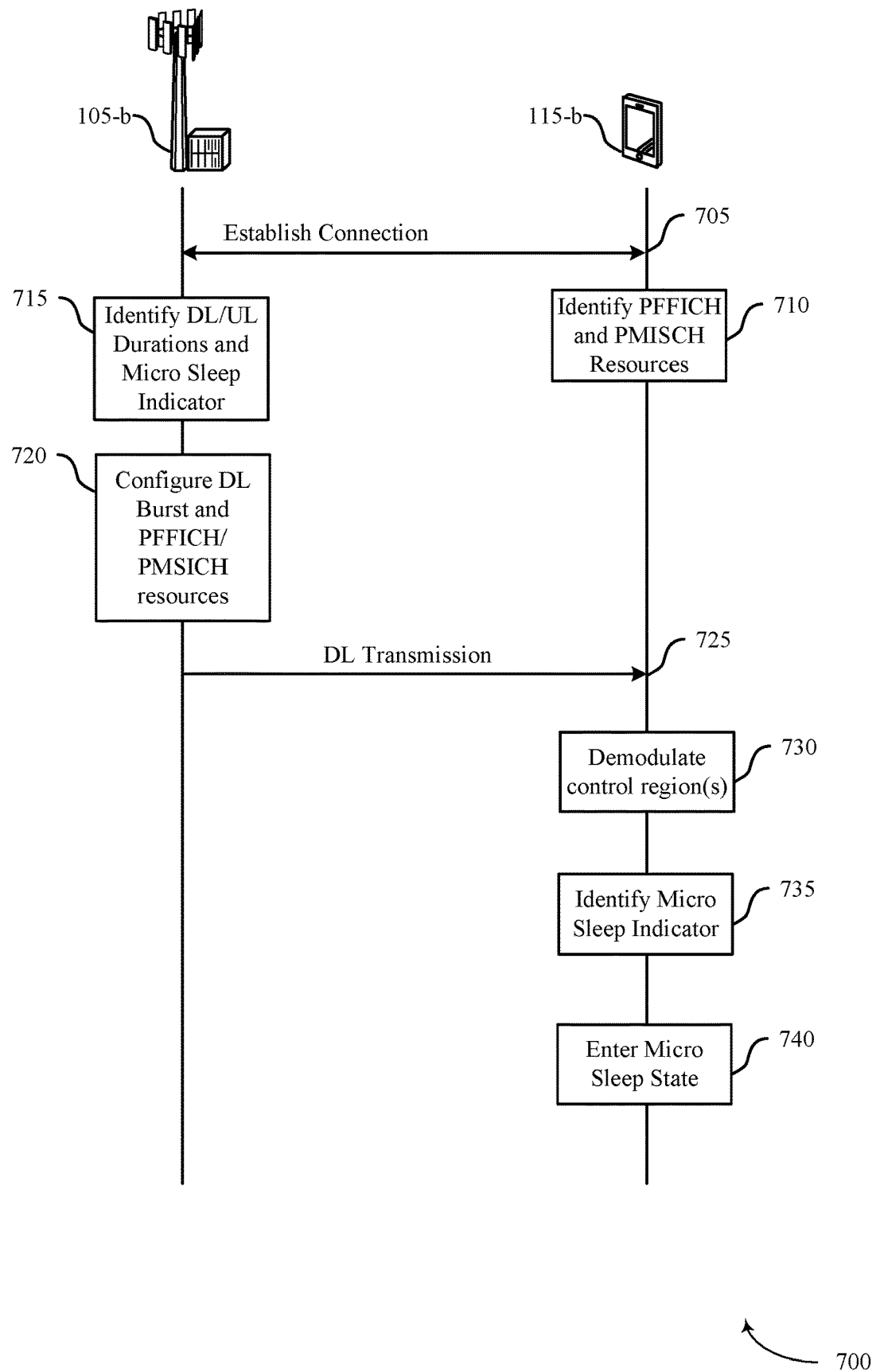
FIG. 7 illustrates an example of a process flow in a system that supports micro sleep indication in accordance with aspects of the present disclosure.

FIG. 7 illustrates an example of a process flow 700 for micro sleep indication in accordance with various aspects of the present disclosure. Process flow 700 may include base station 105-*b* and UE 115-*b*, which may be examples of the corresponding devices described with reference to FIG. 1-2.

The base station 105-*b* and UE 115-*b* may establish connection 705. The UE 115-*b* may, at block 710, identify PFFICH and PMSICH resources that are to be monitored for uplink and downlink information. The base station 105-*b*, at block 715, may identify downlink and uplink durations for a downlink burst and uplink burst, and may identify a micro sleep indicator.

At block 720, base station 105-*b* may configure downlink burst and PFFICH and PMSICH resources. The base station 105-*b* may transmit downlink transmissions 725, which may include the configured PFFICH and PMSICH transmissions. The UE 115-*b*, at block 730, may demodulate the control regions that may include the PFFICH and PMSICH transmissions. At block 735, the UE may identify a micro sleep indicator from the PMSICH. Based at least in part on the micro sleep indicator, the UE 115-*b* may enter a micro sleep state, as indicated at block 740.

Figure 8:
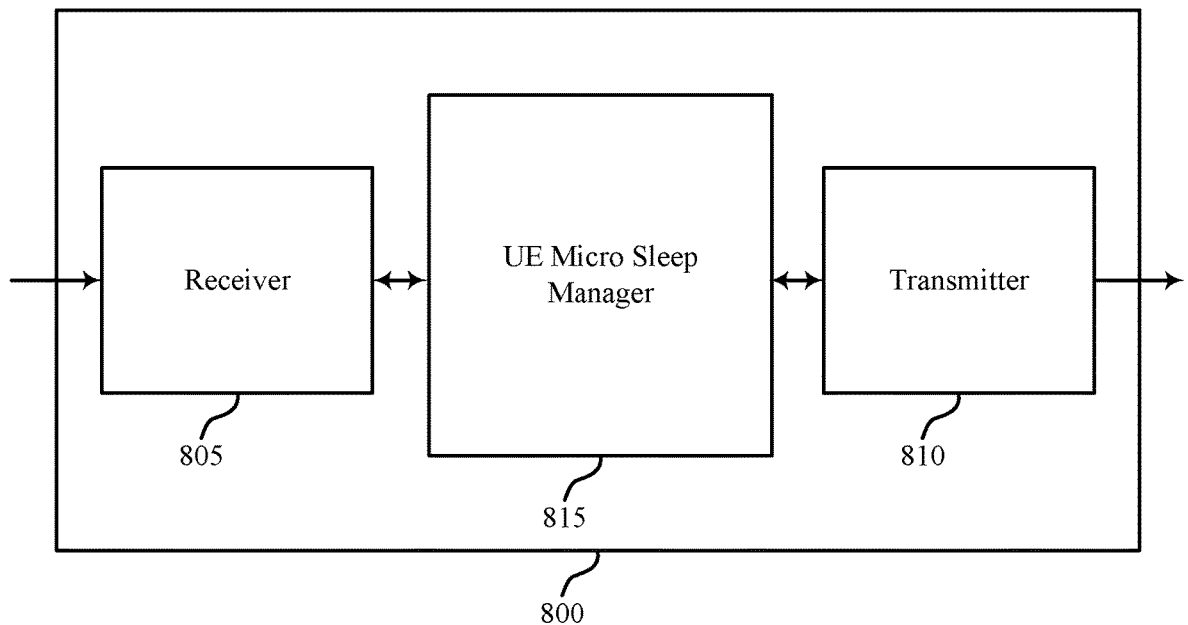
FIGS. 8 through 10 show block diagrams of a wireless device that supports micro sleep indication in accordance with aspects of the present disclosure.

FIG. 8 shows a block diagram of a wireless device 800 that supports micro sleep indication in accordance with various aspects of the present disclosure. Wireless device 800 may be an example of aspects of a UE 115 described with reference to FIGS. 1 and 2. Wireless device 800 may include receiver 805, transmitter 810 and UE micro sleep manager 815. Wireless device 800 may also include a processor. Each of these components may be in communication with each other.

The receiver 805 may receive information such as packets, user data, or control information associated with various information channels (e.g., control channels, data channels, and information related to micro sleep indication, etc.). Information may be passed on to other components of the device. The receiver 805 may be an example of aspects of the transceiver 1125 described with reference to FIG. 11.

The transmitter 810 may transmit signals received from other components of wireless device 800. In some examples, the transmitter 810 may be collocated with a receiver in a transceiver module. For example, the transmitter 810 may be an example of aspects of the transceiver 1125 described with reference to FIG. 11. The transmitter 810 may include a single antenna, or it may include a plurality of antennas.

The UE micro sleep manager 815 may identify a control region in a downlink transmission, demodulate the identified control region of the downlink transmission, identify a micro sleep indicator received in the control region that indicates a micro sleep state may be entered for at least a portion of one or more TTIs, and enter the micro sleep state for at least the portion of the one or more TTIs based on the micro sleep indicator. The UE micro sleep manager 815 may also be an example of aspects of the UE micro sleep manager 1105 described with reference to FIG. 11.

Figure 9:
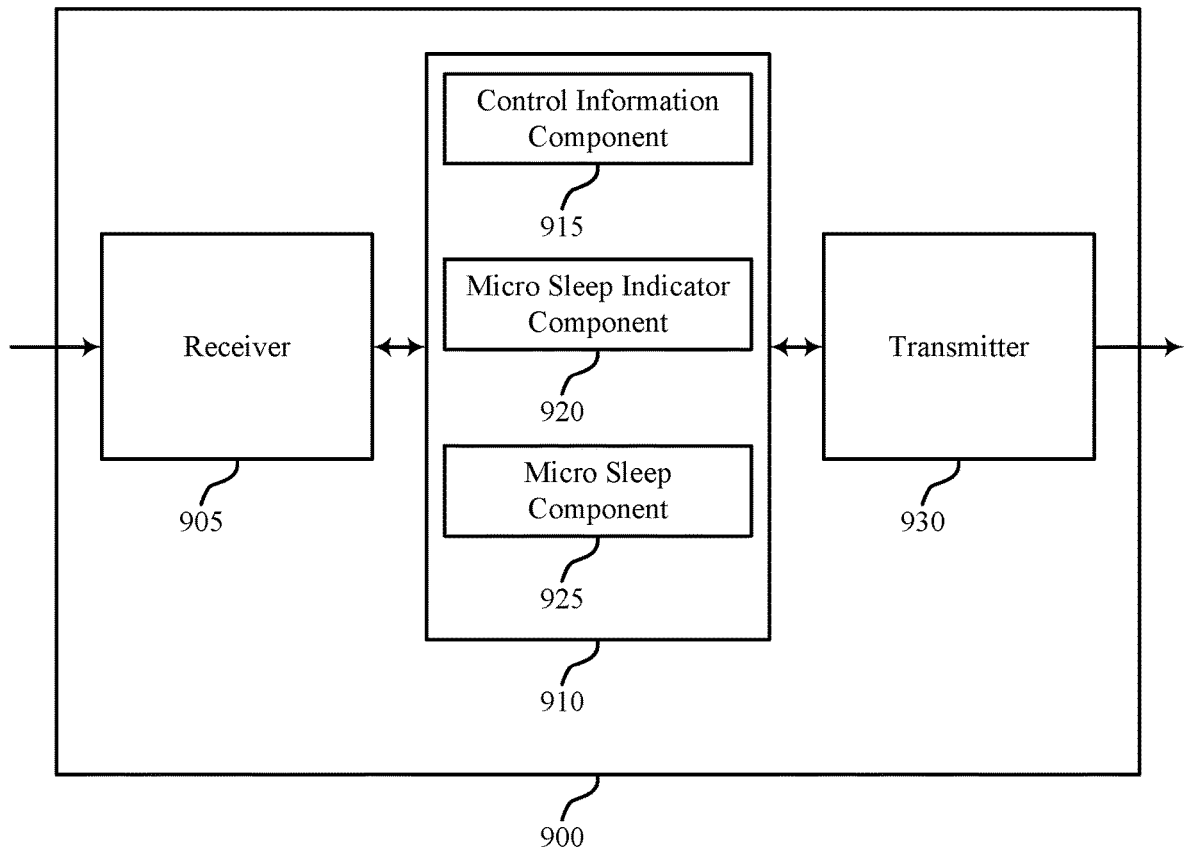

FIG. 9 shows a block diagram of a wireless device 900 that supports micro sleep indication in accordance with various aspects of the present disclosure. Wireless device 900 may be an example of aspects of a wireless device 800 or a UE 115 described with reference to FIGS. 1, 2, and 8. Wireless device 900 may include receiver 905, UE micro sleep manager 910 and transmitter 930. Wireless device 900 may also include a processor. Each of these components may be in communication with each other.

The receiver 905 may receive information which may be passed on to other components of the device. The receiver 905 may also perform the functions described with reference to the receiver 805 of FIG. 8. The receiver 905 may be an example of aspects of the transceiver 1125 described with reference to FIG. 11.

The UE micro sleep manager 910 may be an example of aspects of UE micro sleep manager 815 described with reference to FIG. 8. The UE micro sleep manager 910 may include control information component 915, micro sleep indicator component 920 and micro sleep component 925. The UE micro sleep manager 910 may be an example of aspects of the UE micro sleep manager 1105 described with reference to FIG. 11.

The control information component 915 may identify a control region in a downlink transmission, and demodulate the identified control region of the downlink transmission. In some cases, the control region includes information for an uplink transmission subsequent to the downlink transmission and information for the downlink transmission. In some cases, identifying the control region includes identifying the control region in one or more downlink TTIs.

The micro sleep indicator component 920 may identify a micro sleep state indicator. Micro sleep indicator component 920 may also determine that the micro sleep indicator is not received in any of the one or more downlink TTIs, and identify a micro sleep indicator received in the control region that indicates a micro sleep state may be entered for at least a portion of one or more TTIs.

In some cases, identifying the micro sleep indicator includes identifying a CCE location for the control region within one or more downlink TTIs, and where the micro sleep indicator may be received in any of the one or more downlink TTIs. In some cases, a search space for the CCE is determined based on a search space for a PDCCH. In some cases, the micro sleep indicator includes an indicator that the micro sleep state may be entered for at least a portion of the downlink and subsequent uplink transmission period.

In some cases, the micro sleep indicator includes a one-bit indicator that indicates the micro sleep state may be entered in an absence of a downlink or uplink grant. In some cases, the micro sleep indicator is transmitted in a PMSICH or a PCFICH. In some cases, the micro sleep indicator is transmitted in a PDCCH transmission. In some cases, the micro sleep indicator provides an indication of a duration of a portion of a current downlink TTI. In some cases, the micro sleep indicator is received in a PCFICH transmission that indicates an absence of a PDCCH transmission for a receiver during the current downlink TTI.

The micro sleep component 925 may enable a device to enter a micro sleep state. For example, the micro sleep component 925 may determine a micro sleep duration based on the TTI length indicator and the number of uplink TTIs, enter the micro sleep state for at least a portion of the one or more uplink TTIs, enter the micro sleep state after a last downlink TTI for a duration of one or more uplink TTIs indicated in the micro sleep indicator, enter the micro sleep state after the uplink transmission for a remaining duration of one or more uplink TTIs indicated in the micro sleep indicator, enter the micro sleep state for a remaining duration of the one or more remaining downlink TTIs and the one or more uplink TTIs, exit the micro sleep state at a start of a subsequent downlink TTI after the current downlink TTI, and enter the micro sleep state for at least the portion of the one or more TTIs based on the micro sleep indicator.

In some cases, entering the micro sleep state further includes entering the micro sleep state after the uplink transmission for a remaining duration of one or more uplink TTIs indicated in the micro sleep indicator. In some cases, entering the micro sleep state includes entering the micro sleep state for the duration of the portion of the current downlink TTI. In some cases, the micro sleep state is entered prior to receiving any PDCCH transmissions received in the current downlink TTI.

The transmitter 930 may transmit signals received from other components of wireless device 900. In some examples, the transmitter 930 may be collocated with a receiver in a transceiver module. For example, the transmitter 930 may be an example of aspects of the transceiver 1125 described with reference to FIG. 11. The transmitter 930 may utilize a single antenna, or it may utilize a plurality of antennas.

Figure 10:
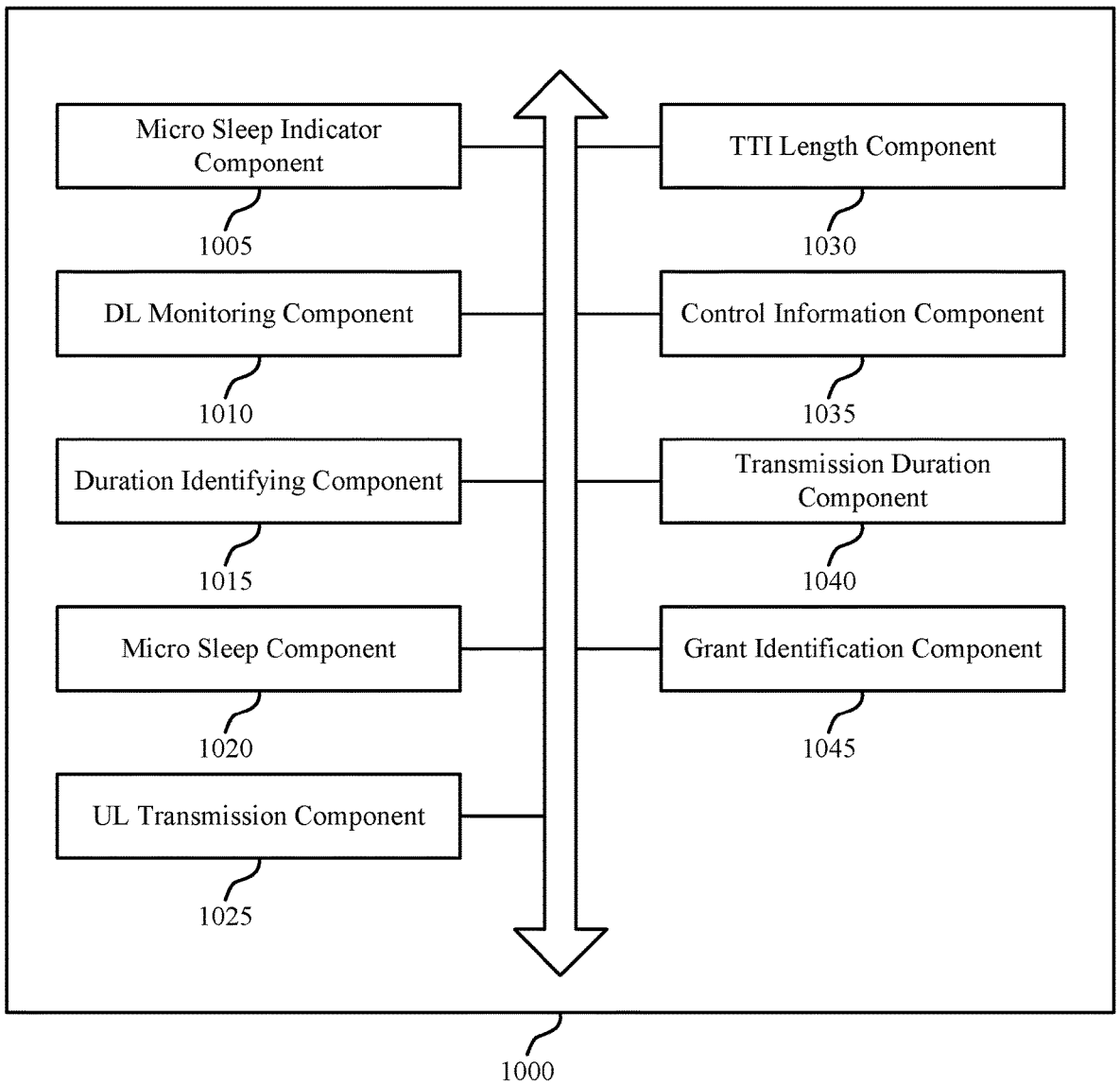

FIG. 10 shows a block diagram of a UE micro sleep manager 1000 which may be an example of the corresponding component of wireless device 800 or wireless device 900. That is, UE micro sleep manager 1000 may be an example of aspects of UE micro sleep manager 815 or UE micro sleep manager 910 described with reference to FIGS. 8 and 9. The UE micro sleep manager 1000 may also be an example of aspects of the UE micro sleep manager 1105 described with reference to FIG. 11.

The UE micro sleep manager 1000 may include micro sleep indicator component 1005, downlink monitoring component 1010, duration identifying component 1015, micro sleep component 1020, uplink transmission component 1025, TTI length component 1030, control information component 1035, transmission duration component 1040 and grant identification component 1045. Each of these modules may communicate, directly or indirectly, with one another (e.g., via one or more buses).

The micro sleep indicator component 1005 may identify a micro sleep state indicator. Micro sleep indicator component 1005 may also determine that the micro sleep indicator is not received in any of the one or more downlink TTIs and identify a micro sleep indicator received in the control region that indicates a micro sleep state may be entered for at least a portion of one or more TTIs.

The downlink monitoring component 1010 may monitor for one or more subsequent downlink transmissions. The duration identifying component 1015 may in some cases, entering the micro sleep state includes identifying a duration of one or more uplink TTIs.

The micro sleep component 1020 may enable a device to enter a micro sleep state, determine a micro sleep duration based on the TTI length indicator and the number of uplink TTIs, enter the micro sleep state for at least a portion of the one or more uplink TTIs, enter the micro sleep state after a last downlink TTI for a duration of one or more uplink TTIs indicated in the micro sleep indicator, enter the micro sleep state after the uplink transmission for a remaining duration of one or more uplink TTIs indicated in the micro sleep indicator, enter the micro sleep state for a remaining duration of the one or more remaining downlink TTIs and the one or more uplink TTIs, exit the micro sleep state at a start of a subsequent downlink TTI after the current downlink TTI, and enter the micro sleep state for at least the portion of the one or more TTIs based on the micro sleep indicator.

The uplink transmission component 1025 may transmit an uplink transmission using resources provided in the uplink grant during one or more uplink TTIs. The TTI length component 1030 may identify a TTI length indicator in the control region. In some cases, entering the micro sleep state includes identifying a duration of one or more uplink TTIs and one or more remaining downlink TTIs of the downlink transmission.

The control information component 1035 may identify a control region in a downlink transmission, and demodulate the identified control region of the downlink transmission. In some cases, the control region includes information for an uplink transmission subsequent to the downlink transmission and information for the downlink transmission. In some cases, identifying the control region includes identifying the control region in one or more downlink TTIs.

The transmission duration component 1040 may identify a number of uplink TTIs of the uplink transmission based on information in the control region, monitor at least a portion of one or more downlink TTIs, and determine a duration of the downlink transmission and a subsequent uplink transmission period. In some cases, determining the duration of the downlink transmission and the subsequent uplink transmission period includes identifying the duration of the downlink transmission and the subsequent uplink transmission period from a PFFICH transmission, or identifying the duration of the downlink transmission and the subsequent uplink transmission period from an RTS/CTS procedure initiated prior to the downlink transmission.

The grant identification component 1045 may acknowledge the downlink grant in an uplink transmission during one of the one or more uplink TTIs. In some cases, entering the micro sleep state further includes determining that the one or more downlink TTIs do not contain a downlink grant or an uplink grant. In some cases, entering the micro sleep state further includes determining that the one or more downlink TTIs contain a downlink grant. In some cases, entering the micro sleep state further includes determining that the one or more downlink TTIs contain an uplink grant. In some cases, identifying the micro sleep indicator further includes identifying that the micro sleep indicator signals an absence of additional downlink grants before a subsequent uplink TTI.

Figure 11:
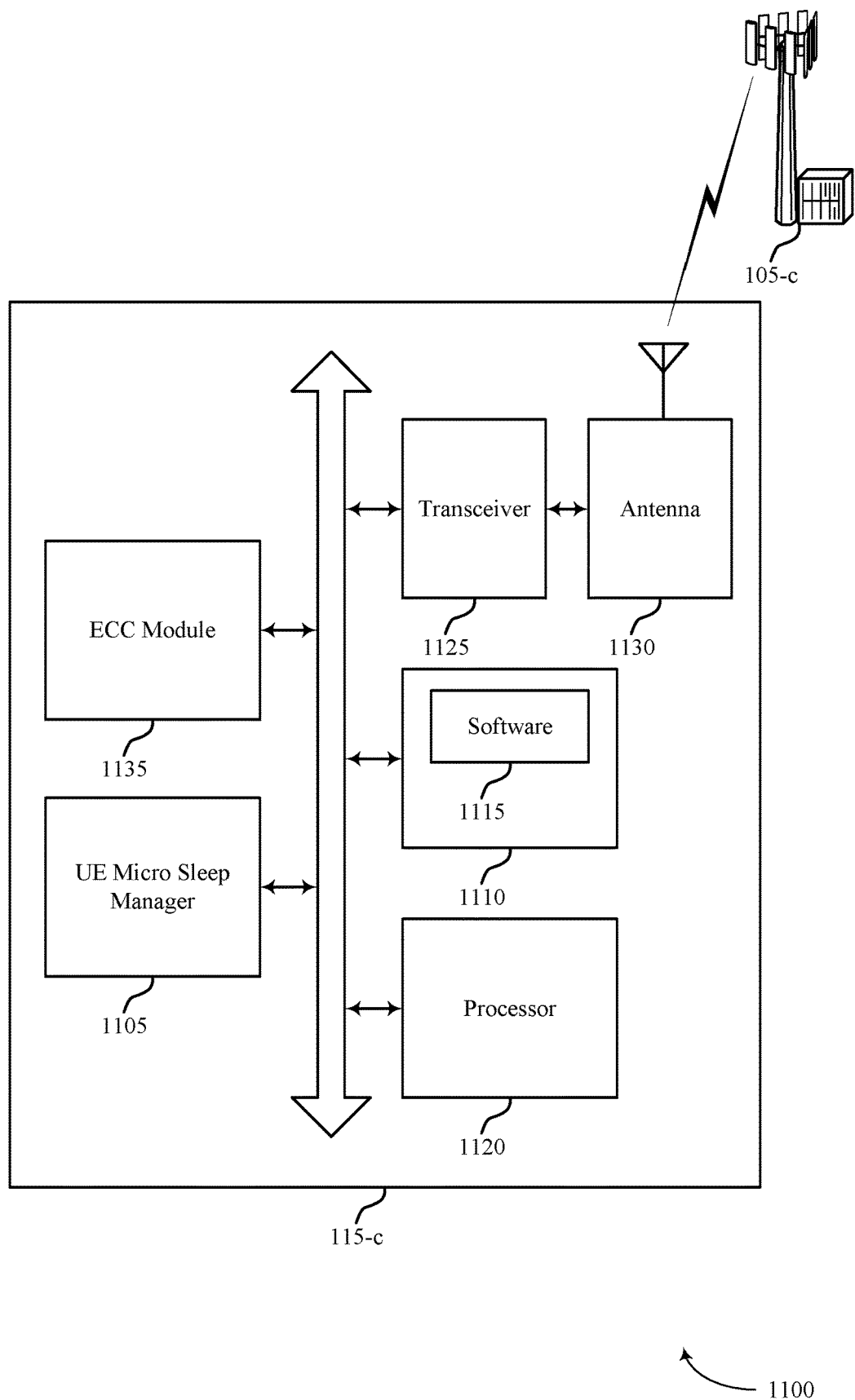
FIG. 11 illustrates a diagram of a system including a UE that supports micro sleep indication in accordance with aspects of the present disclosure.

FIG. 11 shows a diagram of a system 1100 including a device that supports micro sleep indication in accordance with various aspects of the present disclosure. For example, system 1100 may include UE 115-c, which may be an example of a wireless device 800, a wireless device 900, or a UE 115 as described with reference to FIGS. 1, 2 and 8 through 10.

UE 115-c may also include UE micro sleep manager 1105, memory 1110, processor 1120, transceiver 1125, antenna 1130 and ECC module 1135. Each of these modules may communicate, directly or indirectly, with one another (e.g., via one or more buses). The UE micro sleep manager 1105 may be an example of a UE micro sleep manager as described with reference to FIGS. 8 through 10.

The memory 1110 may include random access memory (RAM) and read only memory (ROM). The memory 1110 may store computer-readable, computer-executable software including instructions that, when executed, cause the processor to perform various functions described herein (e.g., micro sleep indication, etc.). In some cases, the software 1115 may not be directly executable by the processor but may cause a computer (e.g., when compiled and executed) to perform functions described herein. The processor 1120 may include an intelligent hardware device, (e.g., a central processing unit (CPU), a microcontroller, an application specific integrated circuit (ASIC), etc.)

The transceiver 1125 may communicate bi-directionally, via one or more antennas, wired, or wireless links, with one or more networks, as described above. For example, the transceiver 1125 may communicate bi-directionally with a base station 105 or a UE 115. The transceiver 1125 may also include a modem to modulate the packets and provide the modulated packets to the antennas for transmission, and to demodulate packets received from the antennas. In some cases, the wireless device may include a single antenna 1130. However, in some cases the device may have more than one antenna 1130, which may be capable of concurrently transmitting or receiving multiple wireless transmissions.

ECC module 1135 may enable a device to operate using eCC as described above with reference to FIG. 1.

Figure 12:
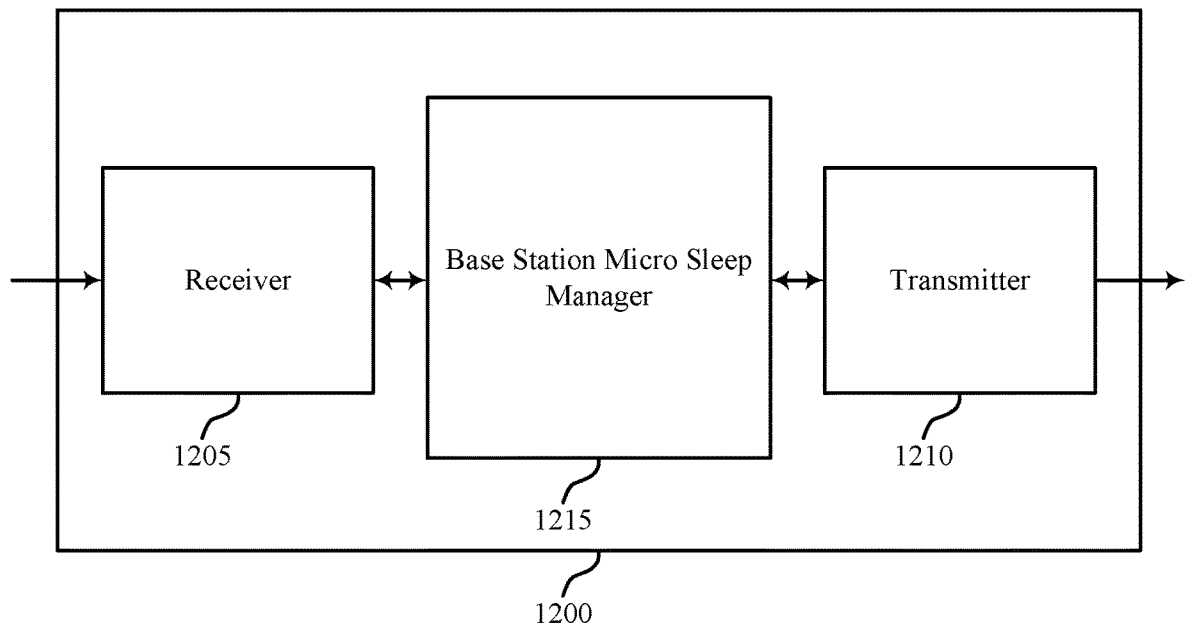
FIGS. 12 through 14 show block diagrams of a wireless device that supports micro sleep indication in accordance with aspects of the present disclosure.

FIG. 12 shows a block diagram of a wireless device 1200 that supports micro sleep indication in accordance with various aspects of the present disclosure. Wireless device 1200 may be an example of aspects of a base station 105 described with reference to FIGS. 1 and 2. Wireless device 1200 may include receiver 1205, transmitter 1210 and base station micro sleep manager 1215. Wireless device 1200 may also include a processor. Each of these components may be in communication with each other.

The receiver 1205 may receive information such as packets, user data, or control information associated with various information channels (e.g., control channels, data channels, and information related to micro sleep indication, etc.). Information may be passed on to other components of the device. The receiver 1205 may be an example of aspects of the transceiver 1525 described with reference to FIG. 15.

The transmitter 1210 may transmit signals received from other components of wireless device 1200. In some examples, the transmitter 1210 may be collocated with a receiver in a transceiver module. For example, the transmitter 1210 may be an example of aspects of the transceiver 1525 described with reference to FIG. 15. The transmitter 1210 may include a single antenna, or it may include a plurality of antennas.

The base station micro sleep manager 1215 may identify a downlink transmission duration for downlink transmissions to one or more UEs and an uplink transmission duration for uplink transmissions from the one or more UE, determine a micro sleep indicator that indicates the one or more UEs may enter a micro sleep state for at least a portion of the downlink transmission duration, the uplink transmission duration, or any combination thereof, and transmit the micro sleep indicator to the one or more UEs in a control channel. The base station micro sleep manager 1215 may also be an example of aspects of the base station micro sleep manager 1505 described with reference to FIG. 15.

Figure 13:
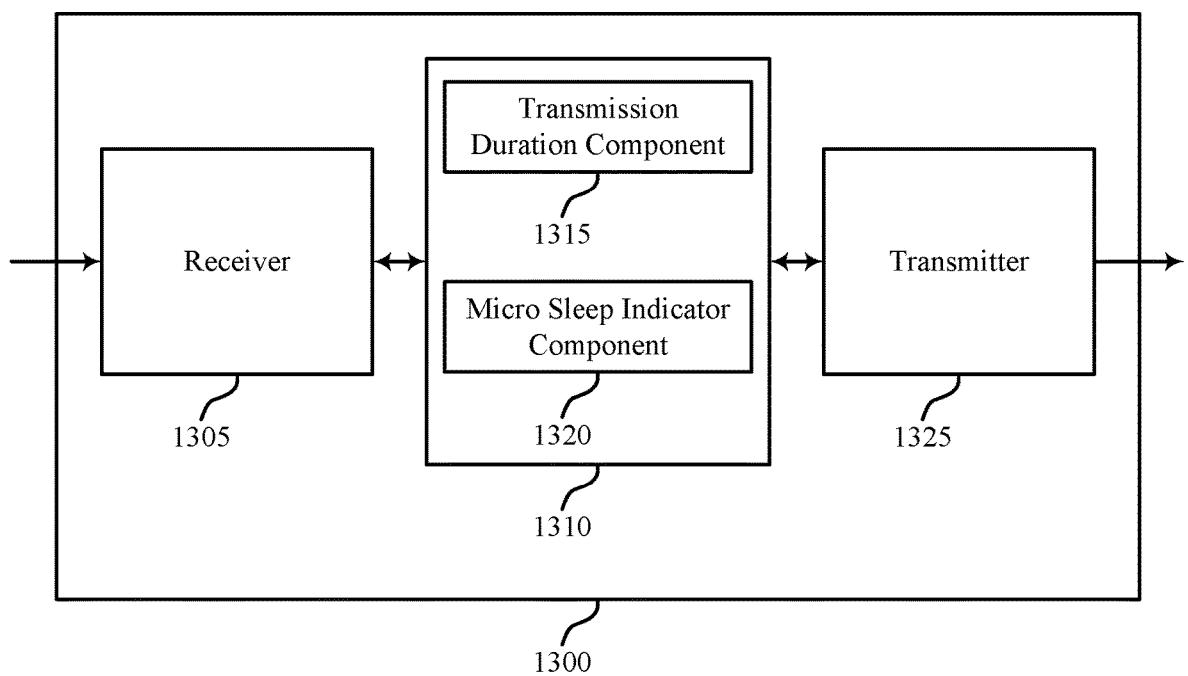

FIG. 13 shows a block diagram of a wireless device 1300 that supports micro sleep indication in accordance with various aspects of the present disclosure. Wireless device 1300 may be an example of aspects of a wireless device 1200 or a base station 105 described with reference to FIGS. 1, 2 and 12. Wireless device 1300 may include receiver 1305, base station micro sleep manager 1310 and transmitter 1325. Wireless device 1300 may also include a processor. Each of these components may be in communication with each other.

The receiver 1305 may receive information which may be passed on to other components of the device. The receiver 1305 may also perform the functions described with reference to the receiver 1205 of FIG. 12. The receiver 1305 may be an example of aspects of the transceiver 1525 described with reference to FIG. 15.

The base station micro sleep manager 1310 may be an example of aspects of base station micro sleep manager 1215 described with reference to FIG. 12. The base station micro sleep manager 1310 may include transmission duration component 1315 and micro sleep indicator component 1320. The base station micro sleep manager 1310 may be an example of aspects of the base station micro sleep manager 1505 described with reference to FIG. 15.

The transmission duration component 1315 may identify a downlink transmission duration for downlink transmissions to one or more UEs and an uplink transmission duration for uplink transmissions from the one or more UE, identify a number of downlink TTIs that are to be used for the downlink transmissions, where the downlink transmission duration corresponds to the downlink TTI duration and number of downlink TTIs, and identify a number of uplink TTIs that are to be used for the uplink transmissions, where an uplink transmission duration corresponds to the uplink TTI duration and number of uplink TTIs.

The micro sleep indicator component 1320 may determine a micro sleep indicator that indicates the one or more UEs may enter a micro sleep state for at least a portion of the downlink transmission duration, the uplink transmission duration, or any combination thereof, transmit the micro sleep indicator to the one or more UEs in a control channel, and set the micro sleep indicator based on the number of uplink TTIs. In some cases, the micro sleep indicator includes an indicator that the micro sleep state may be entered in an absence of a downlink or uplink grant to a UE.

In some cases, the micro sleep indicator provides an indication of a duration of a portion of a current downlink TTI and that the one or more UEs may enter the micro sleep state for the duration of the portion of the current downlink TTI and exit the micro sleep state at a start of a subsequent downlink TTI after the current downlink TTI. In some cases, the micro sleep indicator indicates an absence of a PDCCH transmission for a UE during the current downlink TTI.

The transmitter 1325 may transmit signals received from other components of wireless device 1300. In some examples, the transmitter 1325 may be collocated with a receiver in a transceiver module. For example, the transmitter 1325 may be an example of aspects of the transceiver 1525 described with reference to FIG. 15. The transmitter 1325 may utilize a single antenna, or it may utilize a plurality of antennas.

Figure 14:
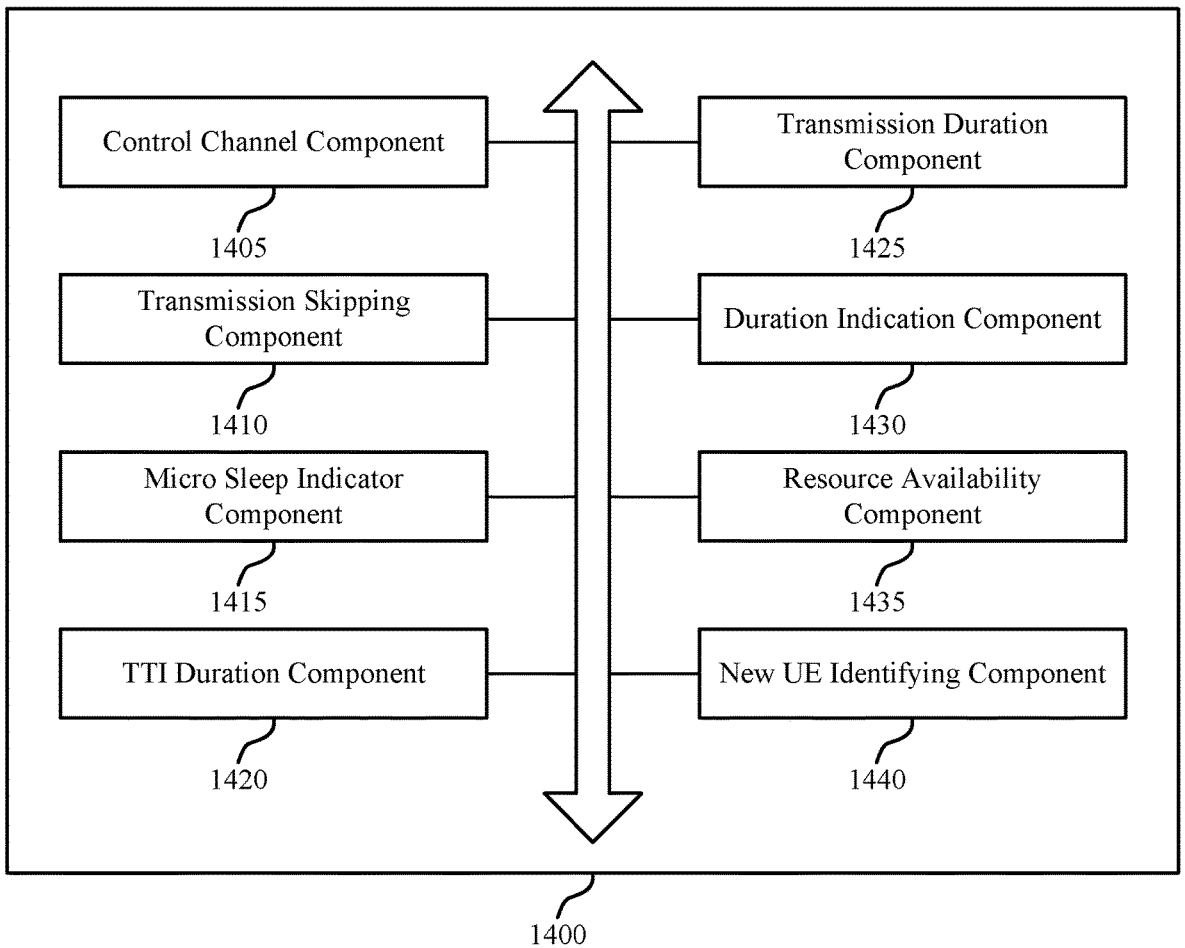

FIG. 14 shows a block diagram of a base station micro sleep manager 1400 which may be an example of the corresponding component of wireless device 1200 or wireless device 1300. That is, base station micro sleep manager 1400 may be an example of aspects of base station micro sleep manager 1215 or base station micro sleep manager 1310 described with reference to FIGS. 12 and 13. The base station micro sleep manager 1400 may also be an example of aspects of the base station micro sleep manager 1505 described with reference to FIG. 15.

The base station micro sleep manager 1400 may include control channel component 1405, transmission skipping component 1410, micro sleep indicator component 1415, TTI duration component 1420, transmission duration component 1425, duration indication component 1430, resource availability component 1435 and new UE identifying component 1440. Each of these modules may communicate, directly or indirectly, with one another (e.g., via one or more buses).

The control channel component 1405 may determine that a first downlink TTI of the one or more downlink TTIs has available resources to transmit the control channel, configure the control channel in the identified CCE of the first downlink TTI, and transmit the control channel. In some cases, transmitting the micro sleep indicator includes identifying a CCE for transmission of the control channel within one or more downlink TTIs. In some cases, transmitting the micro sleep indicator includes identifying a CCE for the control channel within one or more downlink TTIs. In some cases, the control channel includes a PMSICH that is transmitted separately from a PFFICH. In some cases, the control channel includes a PDCCH. The transmission skipping component 1410 may skip the transmission of the control channel in the first downlink TTI.

The micro sleep indicator component 1415 may determine a micro sleep indicator that indicates the one or more UEs may enter a micro sleep state for at least a portion of the downlink transmission duration, the uplink transmission duration, or any combination thereof, transmit the micro sleep indicator to the one or more UEs in a control channel, and set the micro sleep indicator based on the number of uplink TTIs. The TTI duration component 1420 may identify a downlink TTI duration for the downlink transmissions. In some cases, determining the micro sleep indicator includes setting an uplink TTI duration that corresponds to the downlink TTI duration.

The transmission duration component 1425 may identify a downlink transmission duration for downlink transmissions to one or more UEs and an uplink transmission duration for uplink transmissions from the one or more UE, identify a number of downlink TTIs that are to be used for the downlink transmissions, where the downlink transmission duration corresponds to the downlink TTI duration and number of downlink TTIs, and identify a number of uplink TTIs that are to be used for the uplink transmissions, where an uplink transmission duration corresponds to the uplink TTI duration and number of uplink TTIs.

The duration indication component 1430 may transmit an indication of the downlink TTI duration and number of downlink TTIs to the one or more UEs in the control channel.

The resource availability component 1435 may determine that a first downlink TTI of one or more downlink TTIs lacks available resources to transmit the control channel.

The new UE identifying component 1440 may determine whether any new UEs are being scheduled. In some cases, determining the micro sleep indicator includes determining, during a first downlink TTI, that no new UEs are to be scheduled for downlink transmissions during remaining downlink TTIs of the downlink transmission duration, and setting the micro sleep indicator to indicate that the one or more UEs may enter the micro sleep state for at least a portion of the remaining downlink TTIs. In some cases, determining that no new UEs are to be scheduled for downlink transmissions during remaining downlink TTIs of the downlink transmission duration further includes determining that no broadcast grants are scheduled for downlink transmission during remaining downlink TTIs of the downlink transmission duration.

Figure 15:
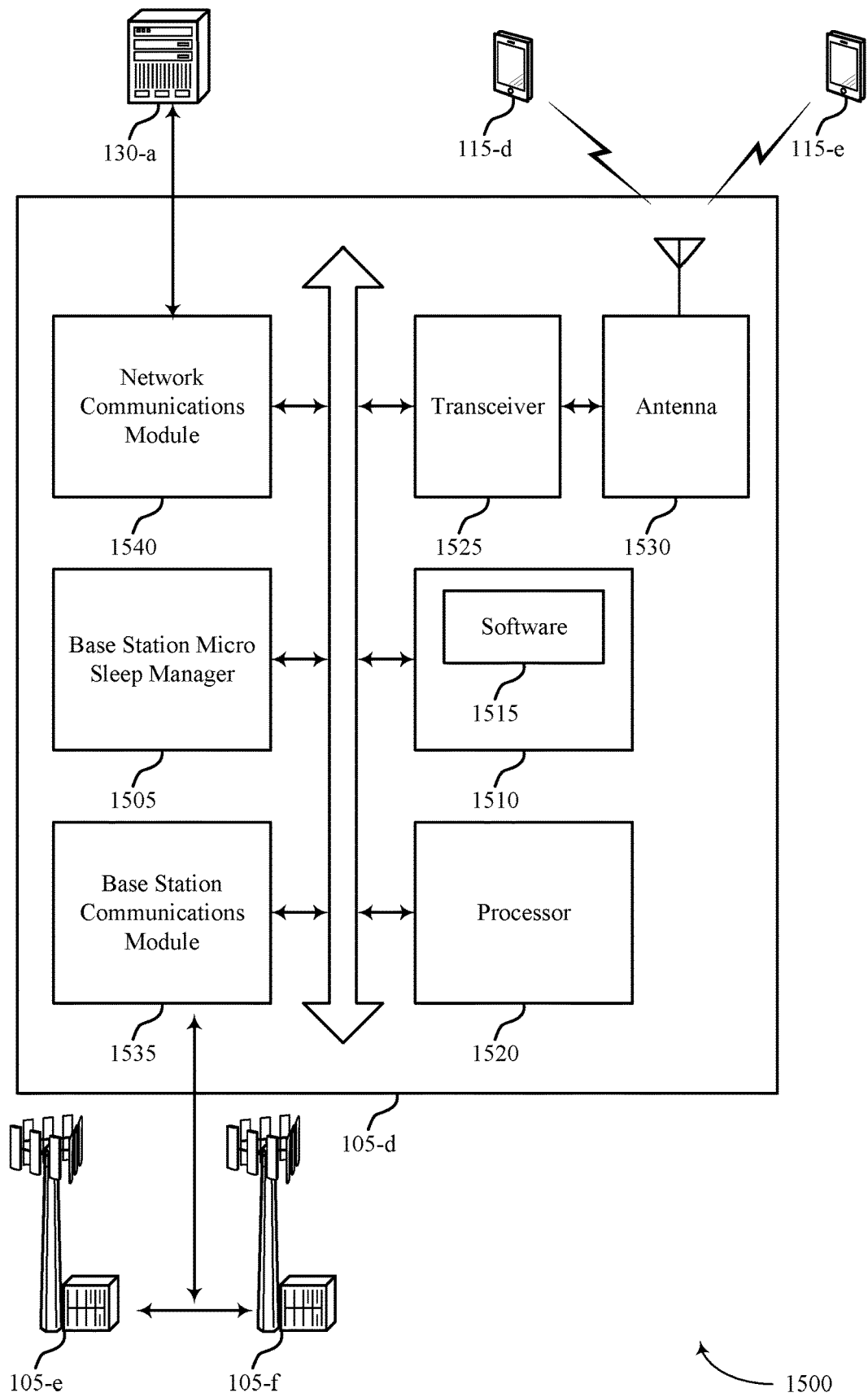
FIG. 15 illustrates a diagram of a system including a base station that supports micro sleep indication in accordance with aspects of the present disclosure.

FIG. 15 shows a diagram of a wireless system 1500 including a device configured that supports micro sleep indication in accordance with various aspects of the present disclosure. For example, system 1500 may include base station 105-d, which may be an example of a wireless device 1200, a wireless device 1300, or a base station 105 as described with reference to FIGS. 1, 2 and 12 through 14. Base station 105-d may also include components for bi-directional voice and data communications including components for transmitting communications and components for receiving communications. For example, base station 105-d may communicate bi-directionally with one or more UEs 115.

Base station 105-d may also include base station micro sleep manager 1505, memory 1510, processor 1520, transceiver 1525, antenna 1530, base station communications module 1535 and network communications module 1540. Each of these modules may communicate, directly or indirectly, with one another (e.g., via one or more buses). The base station micro sleep manager 1505 may be an example of a base station micro sleep manager as described with reference to FIGS. 12 through 14.

The memory 1510 may include RAM and ROM. The memory 1510 may store computer-readable, computer-executable software including instructions that, when executed, cause the processor to perform various functions described herein (e.g., micro sleep indication, etc.). In some cases, the software 1515 may not be directly executable by the processor but may cause a computer (e.g., when compiled and executed) to perform functions described herein. The processor 1520 may include an intelligent hardware device, (e.g., a CPU, a microcontroller, an ASIC, etc.)

The transceiver 1525 may communicate bi-directionally, via one or more antennas, wired, or wireless links, with one or more networks, as described above. For example, the transceiver 1525 may communicate bi-directionally with a base station 105 or a UE 115. The transceiver 1525 may also include a modem to modulate the packets and provide the modulated packets to the antennas for transmission, and to demodulate packets received from the antennas. In some cases, the wireless device may include a single antenna 1530. However, in some cases the device may have more than one antenna 1130, which may be capable of concurrently transmitting or receiving multiple wireless transmissions.

The base station communications module 1535 may manage communications with other base station 105, and may include a controller or scheduler for controlling communications with UEs 115 in cooperation with other base stations 105. For example, the base station communications module 1535 may coordinate scheduling for transmissions to UEs 115 for various interference mitigation techniques such as beamforming or joint transmission. In some examples, base station communications module 1535 may provide an X2 interface within an LTE/LTE-A wireless communication network technology to provide communication between base stations 105.

The network communications module 1540 may manage communications with the core network (e.g., via one or more wired backhaul links). For example, the network communications module 1540 may manage the transfer of data communications for client devices, such as one or more UEs 115.

Figure 16:
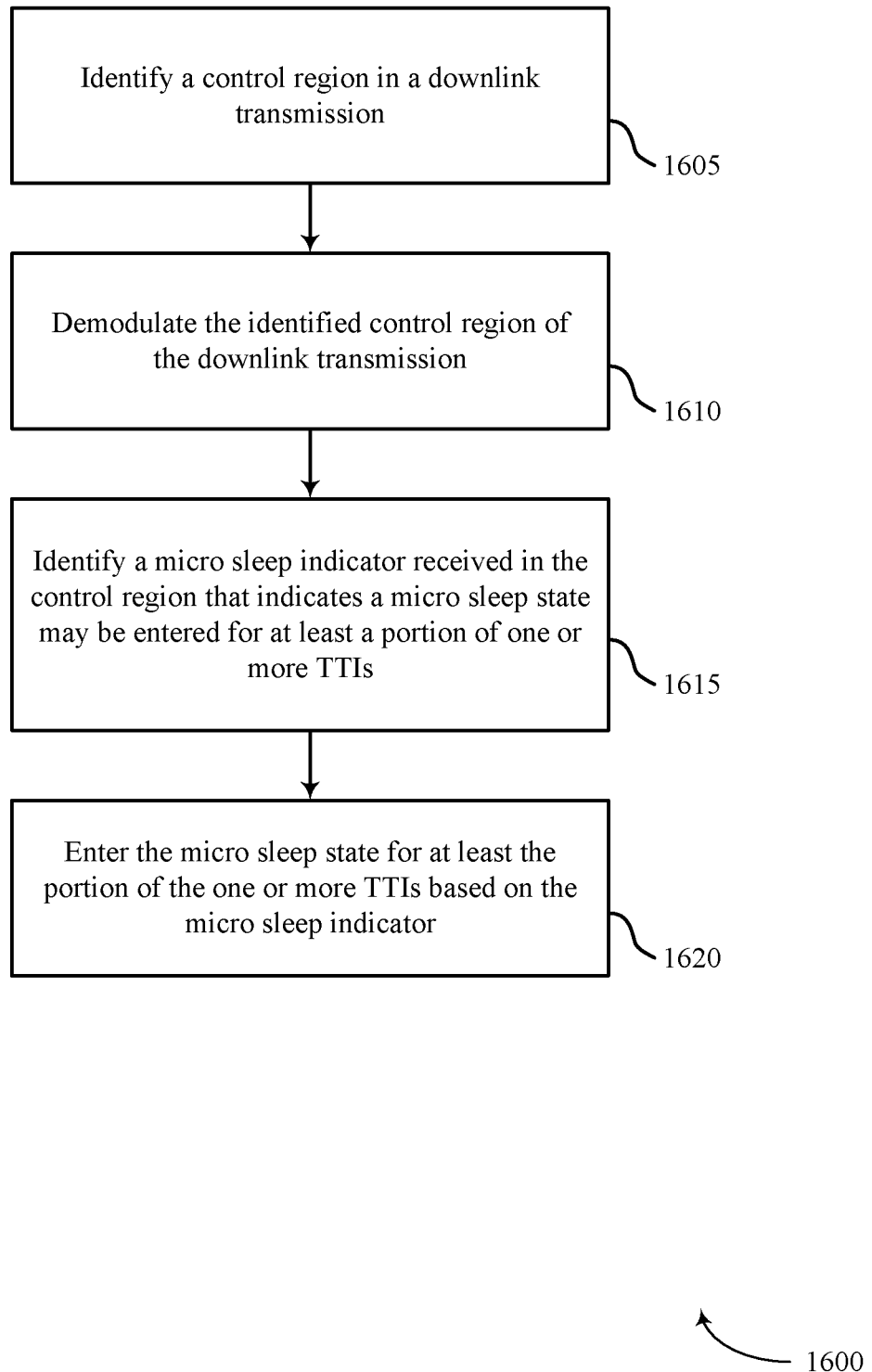
FIGS. 16 through 21 illustrate methods for micro sleep indication in accordance with aspects of the present disclosure.

FIG. 16 shows a flowchart illustrating a method 1600 for micro sleep indication in accordance with various aspects of the present disclosure. The operations of method 1600 may be implemented by a device such as a UE 115 or its components as described with reference to FIGS. 1 and 2. For example, the operations of method 1600 may be performed by the UE micro sleep manager as described herein. In some examples, the UE 115 may execute a set of codes to control the functional elements of the device to perform the functions described below. Additionally or alternatively, the UE 115 may perform aspects of the functions described below using special-purpose hardware.

At block 1605, the UE 115 may identify a control region in a downlink transmission as described above with reference to FIGS. 2 through 7. In certain examples, the operations of block 1605 may be performed by the control information component as described with reference to FIGS. 9 and 10.

At block 1610, the UE 115 may demodulate the identified control region of the downlink transmission as described above with reference to FIGS. 2 through 7. In certain examples, the operations of block 1610 may be performed by the control information component as described with reference to FIGS. 9 and 10.

At block 1615, the UE 115 may identify a micro sleep indicator received in the control region that indicates a micro sleep state may be entered for at least a portion of one or more TTIs as described above with reference to FIGS. 2 through 7. In certain examples, the operations of block 1615 may be performed by the micro sleep indicator component as described with reference to FIGS. 9 and 10.

At block 1620, the UE 115 may enter the micro sleep state for at least the portion of the one or more TTIs based on the micro sleep indicator as described above with reference to FIGS. 2 through 7. In certain examples, the operations of block 1620 may be performed by the micro sleep component as described with reference to FIGS. 9 and 10.

Figure 17:
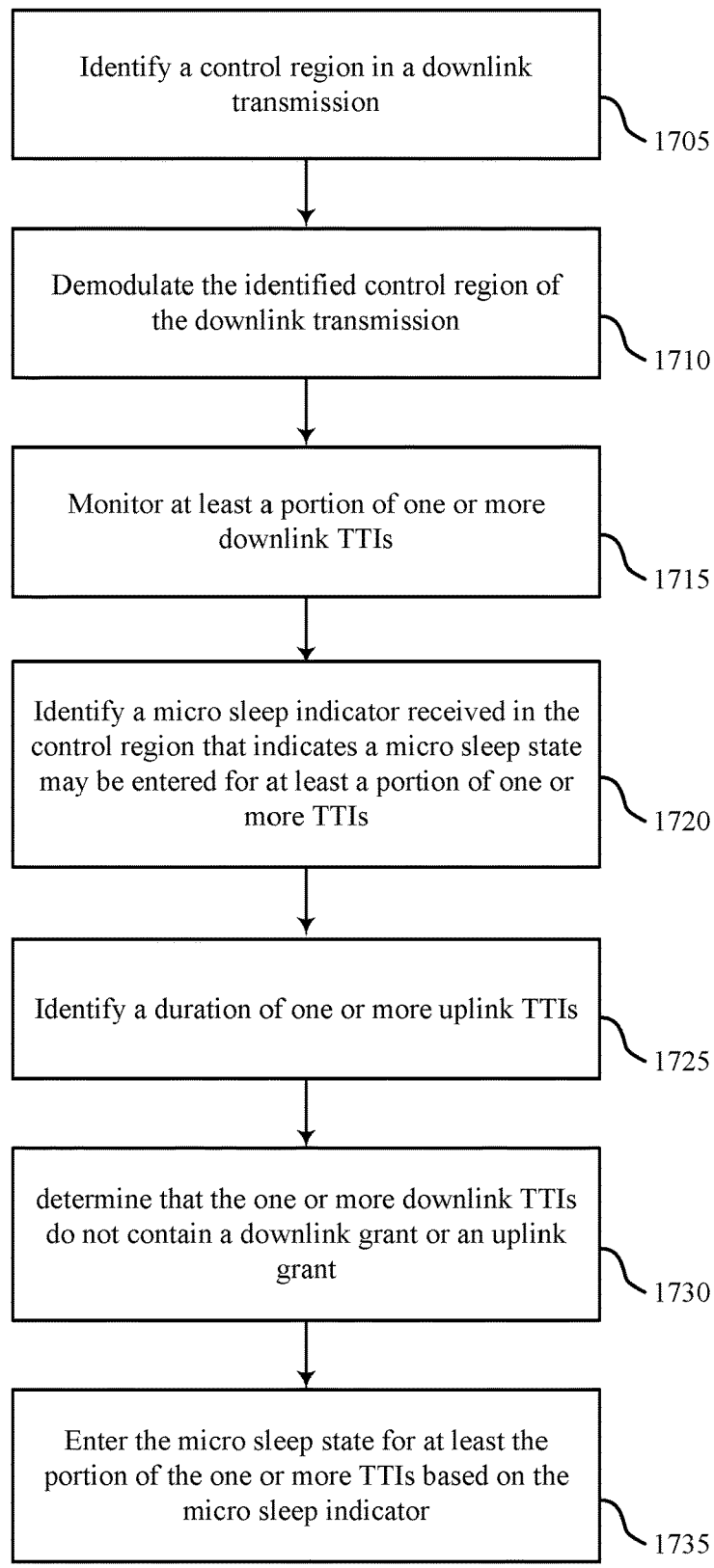

FIG. 17 shows a flowchart illustrating a method 1700 for micro sleep indication in accordance with various aspects of the present disclosure. The operations of method 1700 may be implemented by a device such as a UE 115 or its components as described with reference to FIGS. 1 and 2. For example, the operations of method 1700 may be performed by the UE micro sleep manager as described herein. In some examples, the UE 115 may execute a set of codes to control the functional elements of the device to perform the functions described below. Additionally or alternatively, the UE 115 may perform aspects of the functions described below using special-purpose hardware.

At block 1705, the UE 115 may identify a control region in a downlink transmission as described above with reference to FIGS. 2 through 7. In certain examples, the operations of block 1705 may be performed by the control information component as described with reference to FIGS. 9 and 10.

At block 1710, the UE 115 may demodulate the identified control region of the downlink transmission as described above with reference to FIGS. 2 through 7. In certain examples, the operations of block 1710 may be performed by the control information component as described with reference to FIGS. 9 and 10.

At block 1715, the UE 115 may monitor at least a portion of one or more downlink TTIs as described above with reference to FIGS. 2 through 7. In certain examples, the operations of block 1715 may be performed by the transmission duration component as described with reference to FIGS. 9 and 10.

At block 1720, the UE 115 may identify a micro sleep indicator received in the control region that indicates a micro sleep state may be entered for at least a portion of one or more TTIs as described above with reference to FIGS. 2 through 7. In certain examples, the operations of block 1720 may be performed by the micro sleep indicator component as described with reference to FIGS. 9 and 10.

At block 1725, the UE 115 may determine that the one or more downlink TTIs do not contain a downlink grant or an uplink grant as described above with reference to FIGS. 2 through 7. In certain examples, the operations of block 1725 may be performed by the grant identification component as described with reference to FIGS. 9 and 10.

At block 1730, the UE 115 may identify a duration of one or more uplink TTIs as described above with reference to FIGS. 2 through 7. In certain examples, the operations of block 1730 may be performed by the duration identifying component as described with reference to FIGS. 9 and 10.

At block 1735, the UE 115 may enter the micro sleep state for at least the portion of the one or more TTIs based on the micro sleep indicator as described above with reference to FIGS. 2 through 7. In some cases, the UE 115 may enter the micro sleep state for at least a portion of the one or more uplink TTIs. In some cases, the UE 115 may enter the micro sleep state after a last downlink TTI for a duration of one or more uplink TTIs indicated in the micro sleep indicator. In certain examples, the operations of block 1735 may be performed by the micro sleep component as described with reference to FIGS. 9 and 10.

Figure 18:
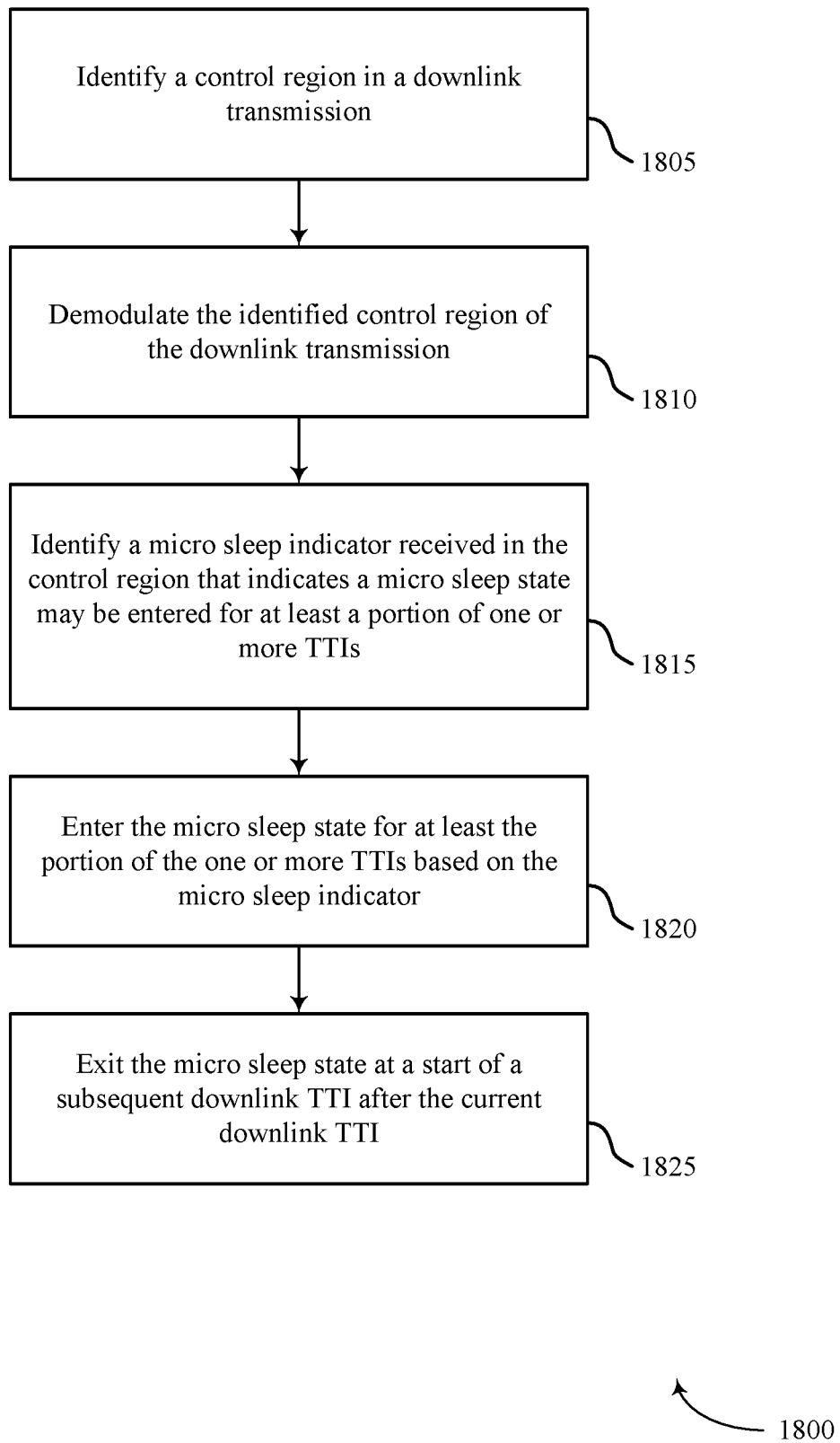

FIG. 18 shows a flowchart illustrating a method 1800 for micro sleep indication in accordance with various aspects of the present disclosure. The operations of method 1800 may be implemented by a device such as a UE 115 or its components as described with reference to FIGS. 1 and 2. For example, the operations of method 1800 may be performed by the UE micro sleep manager as described herein. In some examples, the UE 115 may execute a set of codes to control the functional elements of the device to perform the functions described below. Additionally or alternatively, the UE 115 may perform aspects of the functions described below using special-purpose hardware.

At block 1805, the UE 115 may identify a control region in a downlink transmission as described above with reference to FIGS. 2 through 7. In certain examples, the operations of block 1805 may be performed by the control information component as described with reference to FIGS. 9 and 10.

At block 1810, the UE 115 may demodulate the identified control region of the downlink transmission as described above with reference to FIGS. 2 through 7. In certain examples, the operations of block 1810 may be performed by the control information component as described with reference to FIGS. 9 and 10.

At block 1815, the UE 115 may identify a micro sleep indicator received in the control region that indicates a micro sleep state may be entered for at least a portion of one or more TTIs as described above with reference to FIGS. 2 through 7. In some cases, the micro sleep indicator provides an indication of a duration of a portion of a current downlink TTI. In certain examples, the operations of block 1815 may be performed by the micro sleep indicator component as described with reference to FIGS. 9 and 10.

At block 1820, the UE 115 may enter the micro sleep state for at least the portion of the one or more TTIs based on the micro sleep indicator as described above with reference to FIGS. 2 through 7. In some cases, entering the micro sleep state includes entering the micro sleep state for the duration of the portion of the current downlink TTI. In certain examples, the operations of block 1820 may be performed by the micro sleep component as described with reference to FIGS. 9 and 10.

At block 1825, the UE 115 may exit the micro sleep state at a start of a subsequent downlink TTI after the current downlink TTI as described above with reference to FIGS. 2 through 7. In certain examples, the operations of block 1825 may be performed by the micro sleep component as described with reference to FIGS. 9 and 10.

Figure 19:
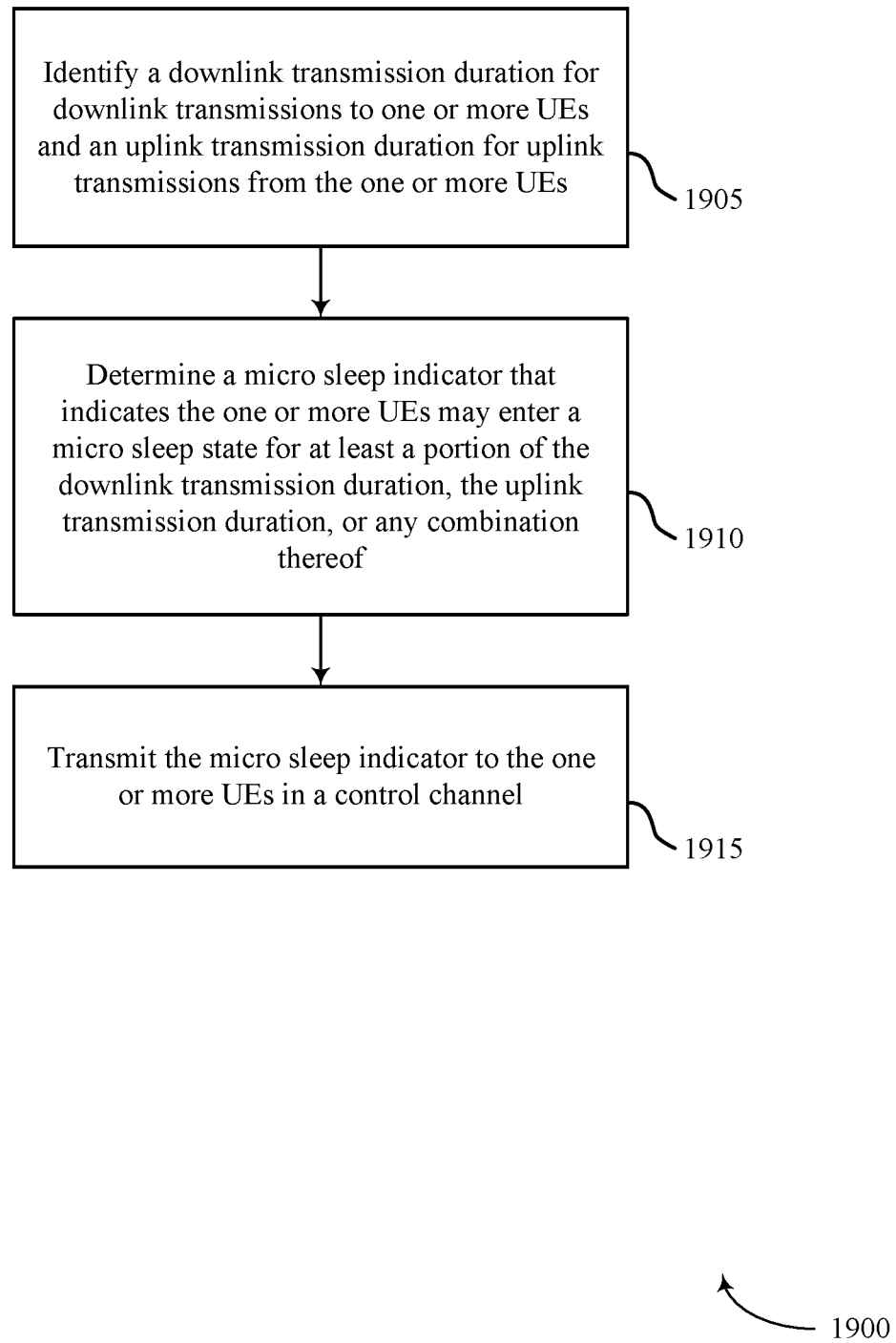

FIG. 19 shows a flowchart illustrating a method 1900 for micro sleep indication in accordance with various aspects of the present disclosure. The operations of method 1900 may be implemented by a device such as a base station 105 or its components as described with reference to FIGS. 1 and 2. For example, the operations of method 1900 may be performed by the base station micro sleep manager as described herein. In some examples, the base station 105 may execute a set of codes to control the functional elements of the device to perform the functions described below. Additionally or alternatively, the base station 105 may perform aspects of the functions described below using special-purpose hardware.

At block 1905, the base station 105 may identify a downlink transmission duration for downlink transmissions to one or more UEs and an uplink transmission duration for uplink transmissions from the one or more UEs as described above with reference to FIGS. 2 through 7. In certain examples, the operations of block 1905 may be performed by the transmission duration component as described with reference to FIGS. 13 and 14.

At block 1910, the base station 105 may determine a micro sleep indicator that indicates the one or more UEs may enter a micro sleep state for at least a portion of the downlink transmission duration, the uplink transmission duration, or any combination thereof as described above with reference to FIGS. 2 through 7. In certain examples, the operations of block 1910 may be performed by the micro sleep indicator component as described with reference to FIGS. 13 and 14.

At block 1915, the base station 105 may transmit the micro sleep indicator to the one or more UEs in a control channel as described above with reference to FIGS. 2 through 7. In certain examples, the operations of block 1915 may be performed by the micro sleep indicator component as described with reference to FIGS. 13 and 14.

Figure 20:
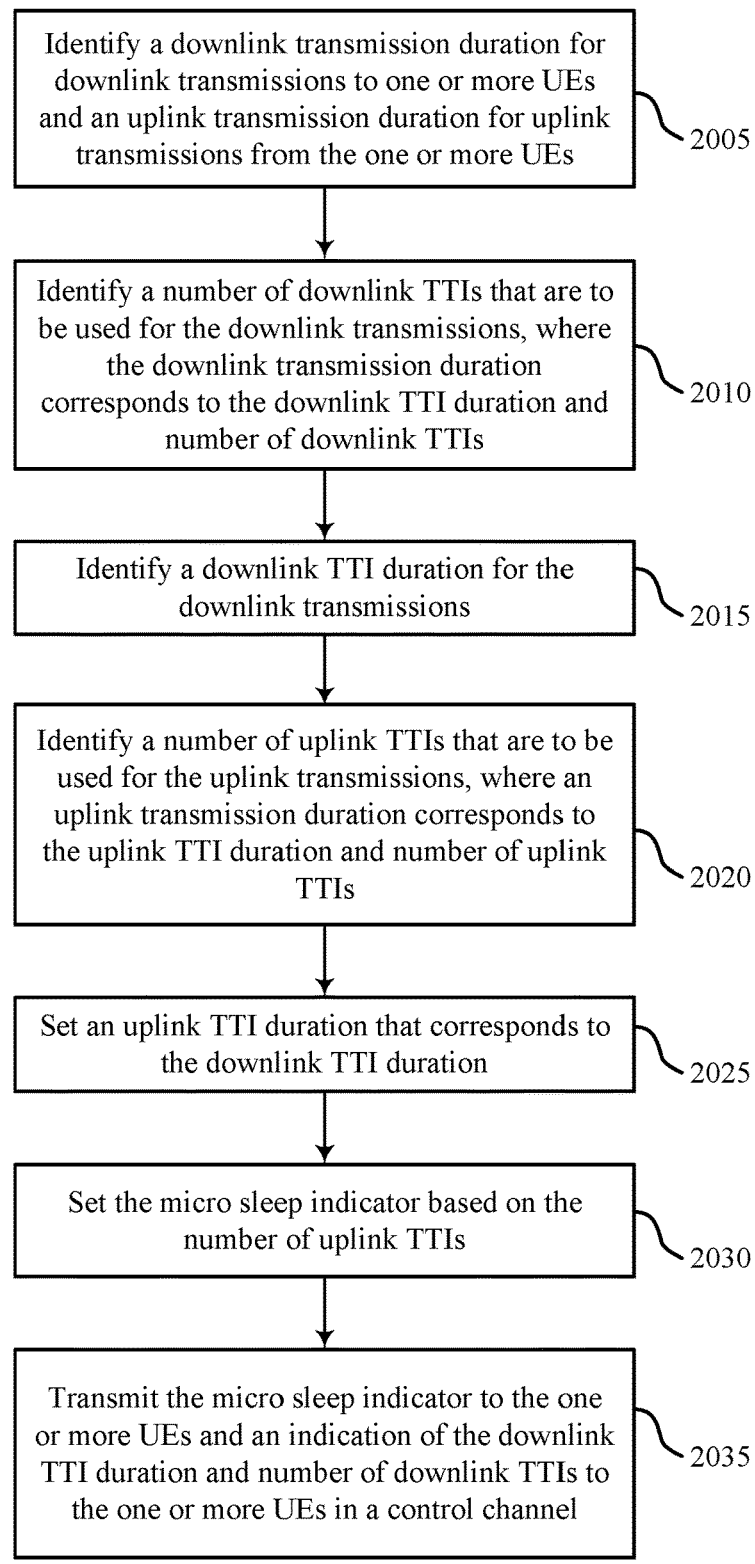

FIG. 20 shows a flowchart illustrating a method 2000 for micro sleep indication in accordance with various aspects of the present disclosure. The operations of method 2000 may be implemented by a device such as a base station 105 or its components as described with reference to FIGS. 1 and 2. For example, the operations of method 2000 may be performed by the base station micro sleep manager as described herein. In some examples, the base station 105 may execute a set of codes to control the functional elements of the device to perform the functions described below. Additionally or alternatively, the base station 105 may perform aspects of the functions described below using special-purpose hardware.

At block 2005, the base station 105 may identify a downlink transmission duration for downlink transmissions to one or more UEs and an uplink transmission duration for uplink transmissions from the one or more UEs as described above with reference to FIGS. 2 through 7. In certain examples, the operations of block 2005 may be performed by the transmission duration component as described with reference to FIGS. 13 and 14.

At block 2010, the base station 105 may identify a number of downlink TTIs that are to be used for the downlink transmissions, where the downlink transmission duration corresponds to the downlink TTI duration and number of downlink TTIs as described above with reference to FIGS. 2 through 7. In certain examples, the operations of block 2010 may be performed by the transmission duration component as described with reference to FIGS. 13 and 14.

At block 2015, the base station 105 may identify a downlink TTI duration for the downlink transmissions as described above with reference to FIGS. 2 through 7. In certain examples, the operations of block 2015 may be performed by the TTI duration component as described with reference to FIGS. 13 and 14.

At block 2020, the base station 105 may identify a number of uplink TTIs that are to be used for the uplink transmissions, where an uplink transmission duration corresponds to the uplink TTI duration and number of uplink TTIs as described above with reference to FIGS. 2 through 7. In certain examples, the operations of block 2020 may be performed by the transmission duration component as described with reference to FIGS. 13 and 14.

At block 2025, the base station 105 may set an uplink TTI duration that corresponds to the downlink TTI duration as described above with reference to FIGS. 2 through 7. In certain examples, the operations of block 2025 may be performed by the TTI duration component as described with reference to FIGS. 13 and 14.

At block 2030, the base station 105 may set the micro sleep indicator based on the number of uplink TTIs as described above with reference to FIGS. 2 through 7. In certain examples, the operations of block 2030 may be performed by the micro sleep indicator component as described with reference to FIGS. 13 and 14.

At block 2035, the base station 105 may transmit the micro sleep indicator and an indication of the downlink TTI duration and number of downlink TTIs to the one or more UEs in a control channel as described above with reference to FIGS. 2 through 7. In certain examples, the operations of block 2035 may be performed by the micro sleep indicator component as described with reference to FIGS. 13 and 14.

Figure 21:
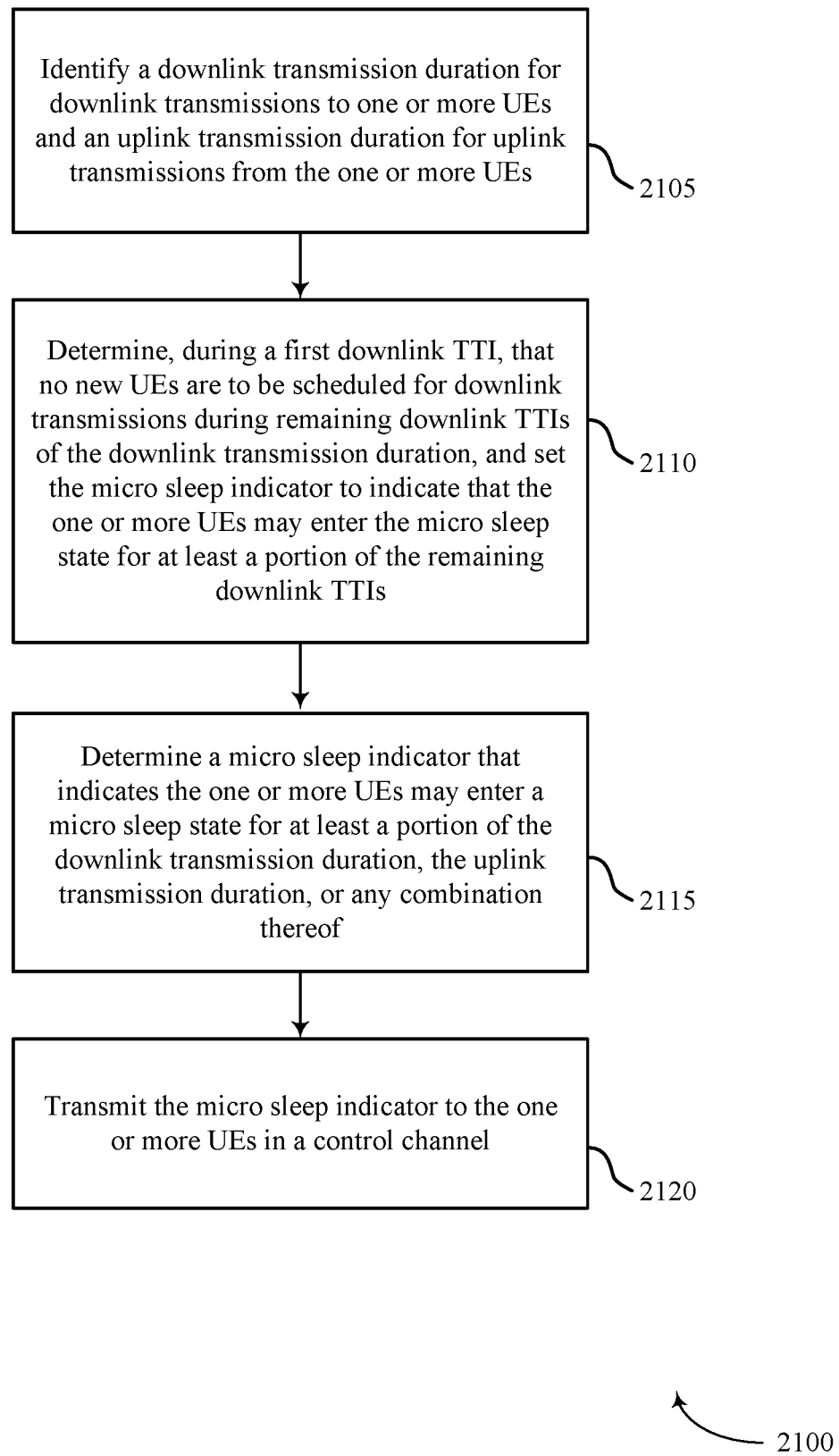

FIG. 21 shows a flowchart illustrating a method 2100 for micro sleep indication in accordance with various aspects of the present disclosure. The operations of method 2100 may be implemented by a device such as a base station 105 or its components as described with reference to FIGS. 1 and 2. For example, the operations of method 2100 may be performed by the base station micro sleep manager as described herein. In some examples, the base station 105 may execute a set of codes to control the functional elements of the device to perform the functions described below. Additionally or alternatively, the base station 105 may perform aspects of the functions described below using special-purpose hardware.

At block 2105, the base station 105 may identify a downlink transmission duration for downlink transmissions to one or more UEs and an uplink transmission duration for uplink transmissions from the one or more UEs as described above with reference to FIGS. 2 through 7. In certain examples, the operations of block 2105 may be performed by the transmission duration component as described with reference to FIGS. 13 and 14.

At block 2110, the base station 105 may determine, during a first downlink TTI, that no new UEs are to be scheduled for downlink transmissions during remaining downlink TTIs of the downlink transmission duration, and set the micro sleep indicator to indicate that the one or more UEs may enter the micro sleep state for at least a portion of the remaining downlink TTIs as described above with reference to FIGS. 2 through 7. In certain examples, the operations of block 2110 may be performed by the new UE identifying component as described with reference to FIGS. 13 and 14.

At block 2115, the base station 105 may determine a micro sleep indicator that indicates the one or more UEs may enter a micro sleep state for at least a portion of the downlink transmission duration, the uplink transmission duration, or any combination thereof as described above with reference to FIGS. 2 through 7. In certain examples, the operations of block 2115 may be performed by the micro sleep indicator component as described with reference to FIGS. 13 and 14.

At block 2120, the base station 105 may transmit the micro sleep indicator to the one or more UEs in a control channel as described above with reference to FIGS. 2 through 7. In certain examples, the operations of block 2120 may be performed by the micro sleep indicator component as described with reference to FIGS. 13 and 14.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for micro sleep indication.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-A are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term eNB may be generally used to describe the base stations. The wireless communication system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or CC associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNB, Home NodeB, a Home eNodeB, or some other suitable terminology. The geographic coverage area for a base station may be divided into sectors making up a portion of the coverage area. The wireless communication system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., CCs). A UE may be able to communicate with various types of base stations and network equipment including macro eNBs, small cell eNBs, relay base stations, and the like.

The wireless communication system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein including, for example, wireless communication system 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Thus, aspects of the disclosure may provide for micro sleep indication. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

What is claimed is:
1. A method for wireless communication, comprising:
identifying a first control region and a second control region in a downlink transmission;
demodulating the identified first control region and the identified second control region of the downlink transmission, wherein the first control region comprises information for an uplink transmission subsequent to the downlink transmission and the second control region comprises information for the downlink transmission;

identifying a micro sleep indicator received in the first control region or the second control region that indicates a micro sleep state may be entered for at least a portion of one or more transmission time intervals (TTIs); and entering the micro sleep state for at least the portion of the one or more TTIs based at least in part on the micro sleep indicator.

2. The method of claim 1, wherein identifying the first control region and the second control region comprises identifying the first control region or the second control region in one or more downlink TTIs.

3. The method of claim 2, wherein identifying the micro sleep indicator received in the first control region or the second control region comprises:

identifying a TTI length indicator in the first control region or the second control region;

identifying a number of uplink TTIs of the uplink transmission based at least in part on information in the first control region; and determining a micro sleep duration based at least in part on the TTI length indicator and the number of uplink TTIs.

4. The method of claim 1, wherein identifying the micro sleep indicator comprises:

identifying a control channel element (CCE) location for the first control region or the second control region within one or more downlink TTIs, and wherein the micro sleep indicator may be received in any of the one or more downlink TTIs.

5. The method of claim 4, wherein a search space for the CCE is determined based at least in part on a search space for a physical downlink control channel (PDCCH).

6. The method of claim 4, further comprising:

determining that the micro sleep indicator is not received in any of the one or more downlink TTIs; and monitoring for one or more subsequent downlink transmissions.

7. The method of claim 1, wherein entering the micro sleep state comprises:

identifying a duration of one or more uplink TTIs;

monitoring at least a portion of one or more downlink TTIs; and entering the micro sleep state for at least a portion of the one or more uplink TTIs.

8. The method of claim 7, wherein entering the micro sleep state further comprises:

determining that the one or more downlink TTIs do not contain a downlink grant or an uplink grant; and entering the micro sleep state after a last downlink TTI for the duration of one or more uplink TTIs indicated in the micro sleep indicator.

9. The method of claim 7, wherein entering the micro sleep state further comprises:

determining that the one or more downlink TTIs contain a downlink grant;

acknowledging the downlink grant in an uplink transmission during one of the one or more uplink TTIs; and entering the micro sleep state after the uplink transmission for a remaining duration of one or more uplink TTIs indicated in the micro sleep indicator.

10. The method of claim 7, wherein entering the micro sleep state further comprises:

determining that the one or more downlink TTIs contain an uplink grant;

transmitting an uplink transmission using resources provided in the uplink grant during one or more uplink TTIs; and entering the micro sleep state after the uplink transmission for a remaining duration of one or more uplink TTIs indicated in the micro sleep indicator.

11. The method of claim 1, wherein identifying the micro sleep indicator further comprises:

identifying that the micro sleep indicator signals an absence of additional downlink grants before a subsequent uplink TTI;

identifying a duration of one or more uplink TTIs and one or more remaining downlink TTIs of the downlink transmission; and entering the micro sleep state for a remaining duration of the one or more remaining downlink TTIs and the one or more uplink TTIs.

12. The method of claim 1, further comprising:

determining a duration of the downlink transmission based at least in part on demodulating the second control region and a duration of a subsequent uplink transmission period based at least in part on demodulating the first control region; and wherein the micro sleep indicator comprises an indicator that the micro sleep state may be entered for at least a portion of the duration of the downlink transmission, the duration of the subsequent uplink transmission period, or a combination thereof.

13. The method of claim 12, wherein determining the duration of the downlink transmission and the subsequent uplink transmission period comprises:

identifying the duration of the downlink transmission and the subsequent uplink transmission period from a physical frame format indicator channel (PFFICH) transmission or a request-to-send/clear-to-send (RTS/CTS) procedure initiated prior to the downlink transmission.

14. The method of claim 12, wherein the micro sleep indicator comprises a one-bit indicator that indicates the micro sleep state may be entered in an absence of a downlink or uplink grant.

15. The method of claim 1, wherein the micro sleep indicator is transmitted in one or both of a physical micro sleep indicator channel (PMSICH) and a physical control format indicator channel (PCFICH), or a physical downlink control channel (PDCCH) transmission.

16. The method of claim 1, wherein the micro sleep indicator provides an indication of a duration of a portion of a current downlink TTI; and wherein entering the micro sleep state comprises:

entering the micro sleep state for the duration of the portion of the current downlink TTI; and exiting the micro sleep state at a start of a subsequent downlink TTI after the current downlink TTI.

17. The method of claim 16, wherein the micro sleep indicator is received in a physical control format indicator channel (PCFICH) transmission that indicates an absence of a physical downlink control channel (PDCCH) transmission for a receiver during the current downlink TTI, and wherein the micro sleep state is entered prior to receiving any PDCCH transmissions in the current downlink TTI.

18. A method for wireless communication, comprising:

identifying a downlink transmission duration for downlink transmissions to one or more user equipment (UEs) and an uplink transmission duration for uplink transmissions from the one or more UEs, wherein the uplink transmissions are subsequent to the downlink transmissions;

transmitting, to the one or more UEs, information for the uplink transmissions in a first control region and information for the downlink transmissions in a second control region;

determining a micro sleep indicator that indicates the one or more UEs may enter a micro sleep state for at least a portion of the downlink transmission duration, the uplink transmission duration, or any combination thereof; and transmitting the micro sleep indicator to the one or more UEs in the first control region or the second control region.

19. The method of claim 18, further comprising:
identifying a downlink transmission time interval (TTI) duration for the downlink transmissions;
identifying a number of downlink TTIs that are to be used for the downlink transmissions, wherein the downlink transmission duration corresponds to the downlink TTI duration and the number of downlink TTIs; and
transmitting an indication of the downlink TTI duration and the number of downlink TTIs to the one or more UEs in the control channel.

20. The method of claim 19, wherein determining the micro sleep indicator comprises:
setting an uplink TTI duration that corresponds to the downlink TTI duration;
identifying a number of uplink TTIs that are to be used for the uplink transmissions, wherein the uplink transmission duration corresponds to the uplink TTI duration and the number of uplink TTIs; and
setting the micro sleep indicator based at least in part on the number of uplink TTIs.

21. The method of claim 19, wherein transmitting the micro sleep indicator comprises:
identifying a control channel element (CCE) for transmission of the control channel within one or more downlink TTIs;
determining that a first downlink TTI of the one or more downlink TTIs has available resources to transmit the control channel;
configuring the control channel in the identified CCE of the first downlink TTI; and
transmitting the control channel.

22. The method of claim 19, wherein transmitting the micro sleep indicator comprises:
identifying a control channel element (CCE) for the control channel within one or more downlink TTIs;
determining that a first downlink TTI of one or more downlink TTIs lacks available resources to transmit the control channel; and
skipping the transmission of the control channel in the first downlink TTI.

23. The method of claim 18, wherein the micro sleep indicator comprises an indicator that the micro sleep state may be entered in an absence of a downlink or uplink grant to a UE.

24. The method of claim 18, wherein the control channel comprises:
a physical micro sleep indicator channel (PMSICH) that is transmitted separately from a physical frame format indicator channel (PFFICH); or
a physical downlink control channel (PDCCH).

25. The method of claim 18, wherein determining the micro sleep indicator comprises:

determining, during a first downlink TTI, that no new UEs are to be scheduled for downlink transmissions during remaining downlink TTIs of the downlink transmission duration;
determining that no broadcast grants are scheduled for downlink transmission during the remaining downlink TTIs of the downlink transmission duration; and
setting the micro sleep indicator to indicate that the one or more UEs may enter the micro sleep state for at least a portion of the remaining downlink TTIs.

26. The method of claim 18, wherein the micro sleep indicator provides an indication of a duration of a portion of a current downlink transmission time interval (TTI) and that the one or more UEs may enter the micro sleep state for the duration of the portion of the current downlink TTI and exit the micro sleep state at a start of a subsequent downlink TTI after the current downlink TTI.

27. The method of claim 18, wherein the micro sleep indicator indicates an absence of a physical downlink control channel (PDCCH) transmission for a UE during a current downlink transmission time interval (TTI).

28. An apparatus for wireless communication, comprising:
a processor;
memory in electronic communication with the processor; and
instructions stored in the memory and operable, when executed by the processor, to cause the apparatus to:
identify a first control region and a second control region in a downlink transmission;
demodulate the identified first control region and the identified second control region of the downlink transmission, wherein the first control region comprises information for an uplink transmission subsequent to the downlink transmission and the second control region comprises information for the downlink transmission;
identify a micro sleep indicator received in the first control region or the second control region that indicates a micro sleep state may be entered for at least a portion of one or more transmission time intervals (TTIs); and
enter the micro sleep state for at least the portion of the one or more TTIs based at least in part on the micro sleep indicator.

29. The apparatus of claim 28, wherein the instructions are further executable by the processor to cause the apparatus to:
identify the first control region or the second control region in one or more downlink TTIs.

30. An apparatus for wireless communication, comprising:
a processor;
memory in electronic communication with the processor; and
instructions stored in the memory and operable, when executed by the processor, to cause the apparatus to:
identify a downlink transmission duration for downlink transmissions to one or more user equipment (UEs) and an uplink transmission duration for uplink transmissions from the one or more UEs, wherein the uplink transmissions are subsequent to the downlink transmissions;
transmit, to the one or more UEs, information for the uplink transmissions in a first control region and information for the downlink transmissions in a second control region;

determine a micro sleep indicator that indicates the one or more UEs may enter a micro sleep state for at least a portion of the downlink transmission duration, the uplink transmission duration, or any combination thereof; and transmit the micro sleep indicator to the one or more UEs in the first control region or the second control region.

\* \* \* \* \*